(12) United States Patent
Kondo et al.

(10) Patent No.: US 7,460,273 B2
(45) Date of Patent: Dec. 2, 2008

(54) IMAGE PROCESSING METHOD AND DEVICE

(75) Inventors: Masaki Kondo, Toyoake (JP); Yasunari Yoshida, Ama-gun (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 595 days.

(21) Appl. No.: 11/188,742

(22) Filed: Jul. 26, 2005

(65) Prior Publication Data

US 2006/0023234 A1    Feb. 2, 2006

(30) Foreign Application Priority Data

Jul. 27, 2004    (JP)    .............. 2004-219203

(51) Int. Cl.
- *G06F 15/00*    (2006.01)
- *G06K 1/00*    (2006.01)
- *H04N 1/60*    (2006.01)
- *G06K 15/10*    (2006.01)

(52) U.S. Cl. .................... 358/1.9; 358/1.8
(58) Field of Classification Search ............ 358/1.9, 358/1.8, 1.2, 512, 518
See application file for complete search history.

(56) References Cited

U.S. PATENT DOCUMENTS

| | | | |
|---|---|---|---|
| 5,162,860 A | 11/1992 | Nami et al. | |
| 5,285,246 A | 2/1994 | Danzuka et al. | |
| 7,175,250 B2 * | 2/2007 | Nimura | 347/19 |
| 2001/0009463 A1 | 7/2001 | Kano et al. | |
| 2005/0128491 A1 * | 6/2005 | Kubo | |

FOREIGN PATENT DOCUMENTS

| | | |
|---|---|---|
| EP | 1089554 A1 | 4/2001 |
| JP | 4204567 A | 7/1992 |
| JP | 4369970 A | 12/1992 |
| JP | 2000078418 | 3/2000 |
| JP | 2000-280531 A | 10/2000 |
| JP | 2000-343761 A | 12/2000 |
| JP | 2001203901 | 7/2001 |

OTHER PUBLICATIONS

Office Action dated Nov. 13, 2006 in Japanese Application No. 2004-219203 and translation thereof.

* cited by examiner

*Primary Examiner*—Douglas Q Tran
(74) *Attorney, Agent, or Firm*—Banner & Witcoff, Ltd

(57) ABSTRACT

According to an image processing method, an input value combination is received. The input value combination includes a plurality of input values for a plurality of primary colors and is indicative of image information. The received input value combination is converted into an output value combination that includes a plurality of output values for a plurality of components for printing, the plurality of components for printing including black, the output value for black being smaller than or equal to a value of an allowable black maximum. An image obtained by printing an output value combination, whose value for black being greater than zero (0) and smaller than or equal to the value of the allowable black maximum value, exhibits substantially the same gloss with another image obtained by printing an output value combination, whose output value for black being equal to zero (0).

32 Claims, 13 Drawing Sheets

4d(4d')

| GRID NUMBER | ( R, G, B ) | ( C, M, Y ) |
|---|---|---|
| 0 | ( 0, 0, 0) | ( , , ) |
| 1 | ( 16, 0, 0) | ( , , ) |
| 2 | ( 16, 16, 0) | ( , , ) |
| ⋮ | ⋮ | ⋮ |
| $17^3$ | (255, 255, 255) | ( , , ) |

| GRID NUMBER | ( R, G, B ) | ( C, M, Y, K ) |
|---|---|---|
| 0 | ( 0, 0, 0) | ( , , ) |
| 1 | ( 16, 0, 0) | ( , , ) |
| 2 | ( 16, 16, 0) | ( , , ) |
| ⋮ | ⋮ | ⋮ |
| $17^3$ | (255, 255, 255) | ( , , ) |

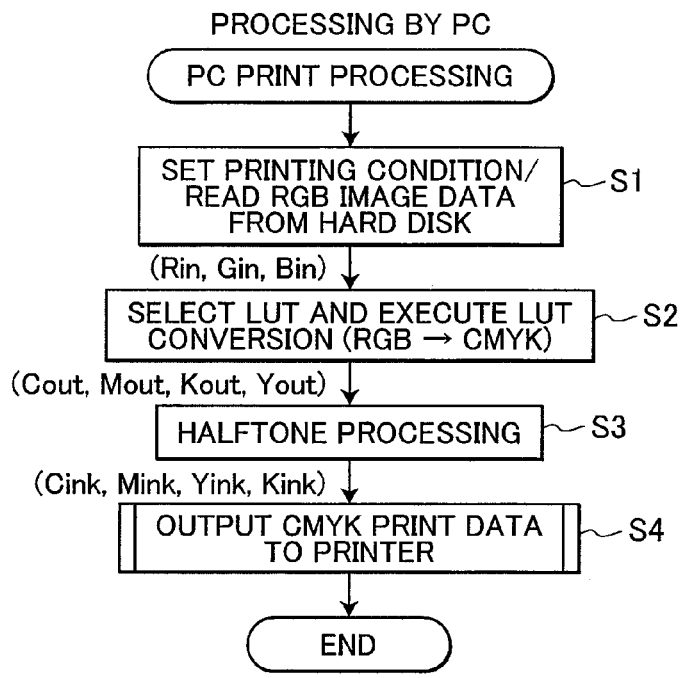
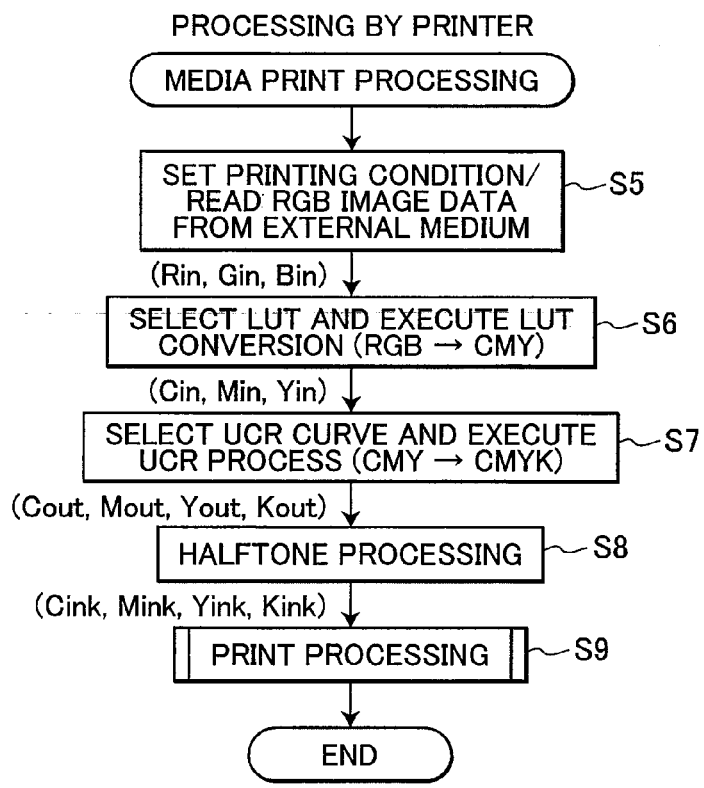

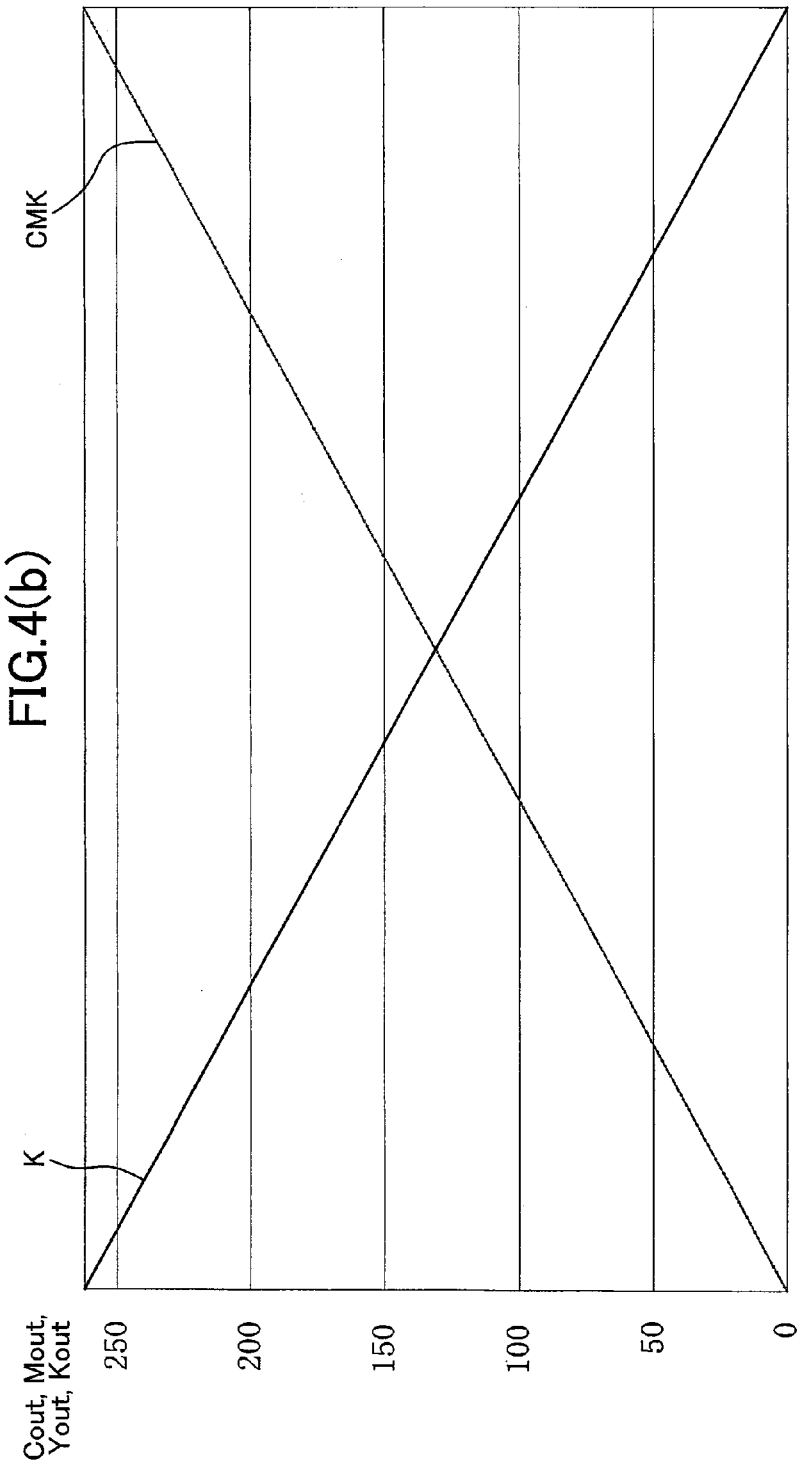

IMAGE PROCESSING METHOD AND DEVICE

BACKGROUND OF THE INVENTION

1. Field of the Invention

The present invention relates to an image processing method and device.

2. Description of Related Art

Full color images can be ideally reproduced using three CMY primary colors of cyan, magenta, and yellow. However, when a so-called gray scale is reproduced using a balance of inks in the three primary colors of cyan (C), magenta (M), and yellow (Y), it is very difficult to create a gray scale with a perfect balance in all tones. Sometimes, the resultant gray scale can appear with coloring, or with insufficiently dense black color.

To produce a single black dot image, pixels in the three primary colors of cyan, magenta, and yellow are ejected onto a recording medium at the same dot image position. If the pixels are ejected at positions slightly shifted from one another, then the region around the subject dot position will have coloring other than black. As a result, a sufficiently black color cannot be attained.

For the above-described purposes, presently-used many image recording devices, such as full-color printers, normally record full-color images using ink in four colors including: black (K) in addition to the three primary colors of cyan, magenta, and yellow.

In this way, by using black color in addition to the three primary colors of cyan, magenta, and yellow, color images can be recorded with a proper black quality. However, when dots of black ink are ejected directly onto a light colored portion, the black dots will give the light colored portion a "rough" dot appearance, resulting in an unnaturally-looking color image.

United States Publication No. US-2001/0009463-A1 has proposed a method of reducing the "rough" dot appearance in the light colored portion.

SUMMARY OF THE INVENTION

Printers can be of a type that use dye-based ink materials for all of the cyan, magenta, yellow and black color components to reproduce a color image formed of four colors. Printers can be of another type that uses inks of different properties for different colors. For example, printers can be of a type that uses dye-based inks for cyan, magenta, and yellow components, while using a pigment-based ink for black component. Dye-based ink and pigment-based ink have different gloss from each other. The differences in gloss between the ink materials generate undesired "false contours", particularly in dark colored portions, still resulting in an unnaturally-looking color image.

In view of the above-described drawbacks, it is an objective of the present invention to provide an improved image processing method and device that can prevent occurrence of false contours that are caused by differences between the gloss of the black component and of the other components.

In order to attain the above and other objects, the present invention provides an image processing method, including: receiving an input value combination that includes a plurality of input values for a plurality of primary colors and that is indicative of image information; and converting the received input value combination into an output value combination that includes a plurality of output values for a plurality of components for printing, the plurality of components for printing including black, the output value for black being smaller than or equal to a value of an allowable black maximum. An image obtained by printing an output value combination, whose value for black being greater than zero (0) and smaller than or equal to the value of the allowable black maximum value, exhibits substantially the same gloss with another image obtained by printing an output value combination, whose output value for black being equal to zero (0).

According to another aspect, the present invention provides an image processing device, including: a receiving unit; and a converting unit. The receiving unit receives an input value combination that includes a plurality of input values for a plurality of primary colors and that is indicative of image information. The converting unit converts the received input value combination into an output value combination that includes a plurality of output values for a plurality of components for printing, the plurality of components for printing including black, the output value for black being smaller than or equal to a value of an allowable black maximum. An image obtained by printing an output value combination, whose value for black being greater than zero (0) and smaller than or equal to the value of the allowable black maximum value, exhibits substantially the same gloss with another image obtained by printing an output value combination, whose output value for black being equal to zero (0).

According to another aspect, the present invention provides a data storage medium storing an image processing program readable by a computer. The image processing program includes: a program of receiving an input value combination that includes a plurality of input values for a plurality of primary colors and that is indicative of image information; and a program of converting the received input value combination into an output value combination that includes a plurality of output values for a plurality of components for printing, the plurality of components for printing including black, the output value for black being smaller than or equal to a value of an allowable black maximum. An image obtained by printing an output value combination, whose value for black being greater than zero (0) and smaller than or equal to the value of the allowable black maximum value, exhibits substantially the same gloss with another image obtained by printing an output value combination, whose output value for black being equal to zero (0).

BRIEF DESCRIPTION OF THE DRAWINGS

The above and other objects, features and advantages of the invention will become more apparent from reading the following description of the preferred embodiments taken in connection with the accompanying drawings in which:

FIG. 1(f) shows a look-up table for PC printing;

FIG. 3(a) is a flowchart of print processing for PC printing;

FIG. 3(b) is a flowchart of print processing for media printing;

FIG. 4(a) shows a plurality of color samples printed in a band shape;

FIG. 4(b) is a graph showing the amounts of cyan, magenta, and yellow inks and the amount of black ink that are used to produce the plurality of color samples in FIG. 4(a);

DETAILED DESCRIPTION OF THE PREFERRED EMBODIMENTS

Figure 1A:
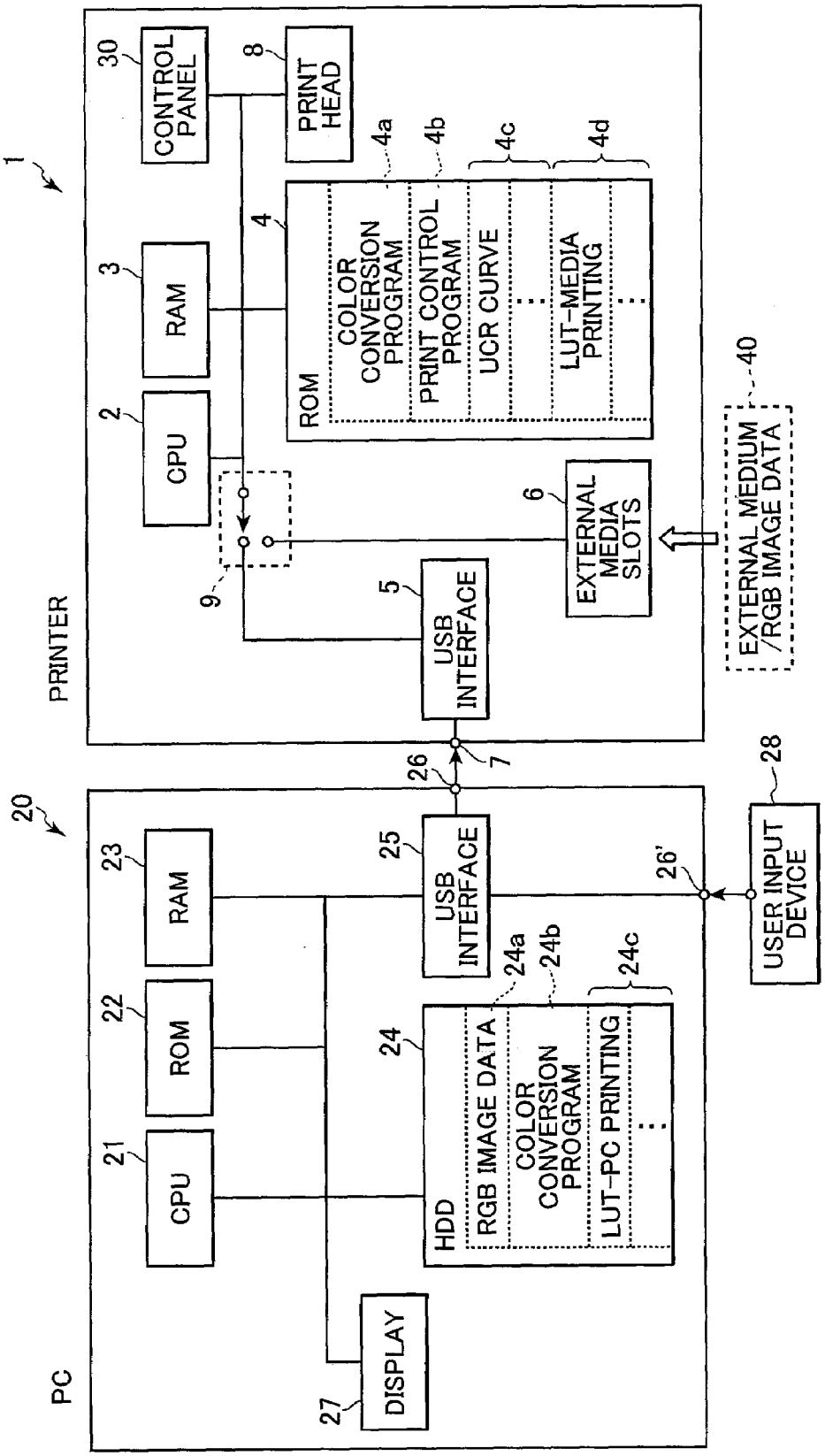
FIG. 1(a) is a block diagram of the electrical configuration of a personal computer (PC) and a printer in accordance with a first embodiment of the present invention.

An image processing method and device according to preferred embodiments of the present invention will be described while referring to the accompanying drawings wherein like parts and components are designated by the same reference numerals to avoid duplicating description.

First Embodiment

A first embodiment of the present invention is described below, with reference to FIGS. 1(a)-8.

A block diagram of the electrical configuration of a personal computer (hereinafter abbreviated to "PC") 20 and a printer 1 according to the present embodiment is shown in FIG. 1(a).

The printer 1 is provided with a CPU 2, a RAM 3, a ROM 4, a USB interface 5, a USB connection terminal 7, a switch 9, the external media slots 6, a control panel 30, and a print head 8.

The print head 8 is mounted on a print-head carriage (not shown) that is designed to move over a sheet material. The sheet material is conveyed by a sheet-conveying device (not shown), which is mounted in the printer 1. The print-head carriage and the sheet-conveying device cooperate to enable the print head 8 to eject inks on the sheet material at desired positions.

In this example, the print head 8 uses dye-based inks for cyan, magenta, and yellow, while using a pigment-based ink for black component.

A USB cable is connected to the USB connection terminal 7. The USB interface 5 is for providing communication with the PC 20 through the USB cable. The USB interface 5 receives CMYK print data from the PC 20 through the USB cable.

The CMYK print data includes a plurality of CMYK ink amount data sets (Cink, Mink, Yink, Kink) for a plurality of pixels in an image desired to be printed. The CMYK ink amount data set (Cink, Mink, Yink, Kink) includes values Cink, Mink, Yink, and Kink for inks of four primary colors of cyan, magenta, yellow, and black, respectively. Each value Cink, Mink, Yink, or Kink is either one of "large dot", "medium dot", "small dot", or "no dot" to indicate the amount of ink of a corresponding color to be ejected.

The external media slots 6 enable insertion and removal of various types of external media 40 that contain RGB image data that has been captured by a digital camera or the like. When some external medium 40 is inserted into one of the external media slots 6, RGB image data stored in the external medium 40 is inputted from the inserted external medium 40 into the printer 1.

The RGB image data includes a plurality of RGB value sets (Rin, Gin, Bin) for a plurality of pixels in an image desired to be printed. Each RGB value set (Rin, Gin, Bin) includes values Rin, Gin, and Bin for three RGB primary colors of red, green, and blue, respectively. Each of the values Rin, Gin, and Bin is expressed as one byte, and therefore ranges from 0 to 255 in decimal notation. Each RGB value set (Rin, Gin, Bin) is therefore defined in a three dimensional RGB color space, wherein R-, G-, and B-axes extend perpendicularly with one another. Each axis extends in a range from zero (0) to 255.

The switch 9 switches between the output of the USB interface 5 and the output of the external media slots 6. The switch 9 may automatically turn to the external media slots 6 when an external medium 40 is inserted into one of the external media slots 6. Or, the user can turn this switch 9 to a desirable one of the USB interface 5 and the external media slots 6.

The control panel 30 enables the user to make various settings as will be described later with reference to FIG. 2(a).

For example, the user manipulates the control panel 30 to select his/her desired printing condition from among a plurality of different printing conditions. Each printing condition is defined by a combination of: a type of CMYK inks to be used in the printing, a type of sheet material to be printed on, and a printing resolution. A plurality of allowable maximum values MaxK for black are set for the plurality of printing conditions, respectively.

The CPU 2 is a microprocessor that executes various programs that are stored in the ROM 4.

The RAM 3 is a memory that has a work area for temporarily storing variables and other data while the CPU 2 is executing the various programs.

The ROM 4 is a read only memory prestored with various programs that are executed by the CPU 2. The ROM 4 is also prestored with constants and tables that are used by the CPU 2 when the CPU 2 executes those programs.

More specifically, the ROM 4 is prestored with: data of control programs, including a color conversion program 4a and a print control program 4b; data of a plurality of UCR (under color removal) curves 4c; and data of a plurality of LUTs (look-up-tables) for media printing 4d.

The color conversion program 4a is a program for converting the RGB value sets (Rin, Gin, Bin) to CMYK ink amount data sets (Cink, Mink, Yink, Kink) so that the resultant ink amount data sets (Cink, Mink, Yink, Kink) will control the printer 1 to reproduce the image represented by the original RGB value sets (Rin, Gin, Bin).

More specifically, the conversion program 4a selects one from among the plurality of look-up tables for media printing 4d, and uses the selected look-up table for media printing 4d to convert each RGB value set (Rin, Gin, Bin) into a CMY value set (Cin, Min, Yin). The conversion program 4a then selects one from among the plurality of UCR curves 4c, and uses the selected UCR curve 4c to convert the CMY value set (Cin, Min, Yin) into a CMYK value set (Cout, Mout, Yout, Kout). The conversion program 4a then executes a halftone processing to convert the CMYK value set (Cout, Mout, Yout, Kout) into a CMYK ink amount data set (Cink, Mink, Yink, Kink). The conversion program 4a then starts a printing process.

The print control program 4b is for performing the printing process by controlling the print head 81, the print-head carriage (not shown), and the sheet-conveying device (not shown) in accordance with the CMYK print information (Cink, Mink, Yink, Kink) obtained by the color conversion program 4a.

The plurality of look-up tables (LUTs) 4d are provided in one to one correspondence with the plurality of different printing conditions. Each look-up table for media printing 4d is a conversion table for converting a set of RGB values (Rin, Gin, Bin) to a three-dimensional CMY value set (Cin, Min, Yin).

Figure 1B:
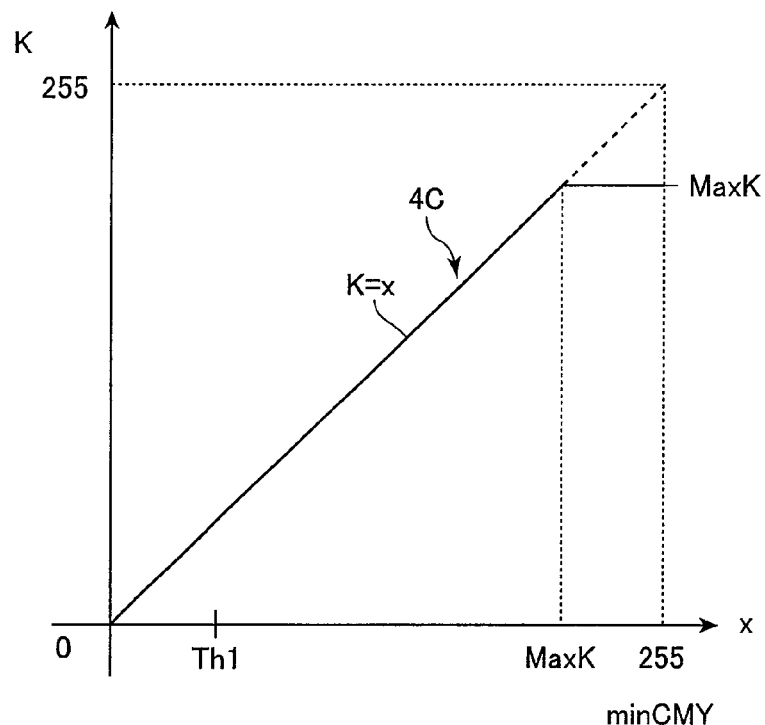
FIGS. 1(b), 1(c), and 1(d) are examples of a UCR curve for media printing.
Figure 1C:
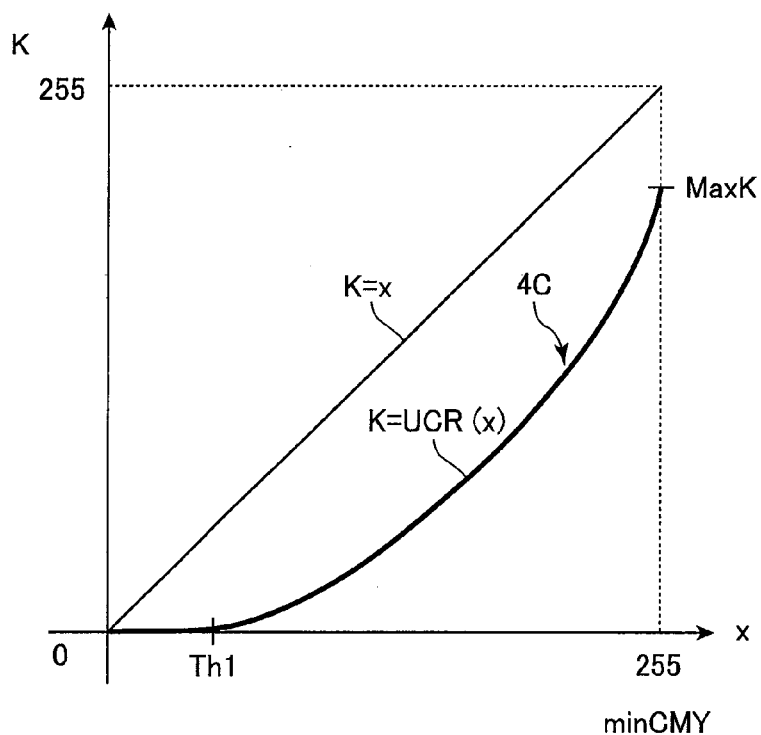
Figures 1D, 1E:
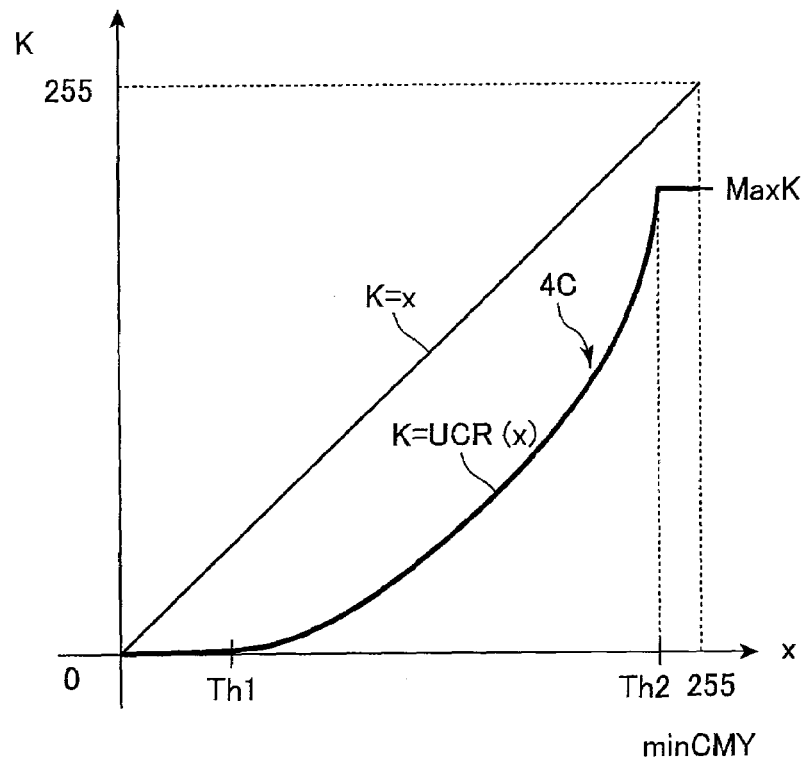
FIG. 1(e) shows a look-up table for media printing.

As shown in FIG. 1(e), each look-up table for media printing 4d is defined for a three-dimensional RGB color grid space. The three-dimensional RGB color grid space is defined by dividing the RGB color space almost uniformly into sixteen sections along each axis. That is, each axis is divided into sixteen regions in almost equal intervals with seventeen grid points. The RGB color grid space therefore has $17^3$ grid points (0, 0, 0), (16, 0, 0), (16, 16, 0), ..., and (255, 255, 255). The $17^3$ grid points are associated with grid numbers "0"-"$17^3$" in such a manner that the grid number "0" indicates the grid point (R, G, B) of (0, 0, 0), the grid number "1" indicates the grid point (R, G, B) of (16, 0, 0), and so on. The look-up table for media printing 4d stores therein a CMY set value (C, M, Y) at each grid point (R, G, B).

The plurality of UCR curves 4c are provided in one to one correspondence with the plurality of different printing conditions.

Each UCR curve 4c is a conversion curve or conversion table for determining the black component value Kout based on the minimum value "minCMY" among one set of CMY values (Cin, Min, Yin). Each UCR curve 4c is characterized by a corresponding allowable maximum value MaxK for black. More specifically, the UCR curve 4c ensures that the black component value Kout will be smaller than or equal to the corresponding allowable maximum value MaxK for black.

FIGS. 1(b)-1(d) are graphs showing representative examples of the form of each UCR curve 4c. In each figure, the horizontal axis x denotes the minimum value "min (CMY)" among the values C, M, and Y in one set of CMY value set (C, M, Y), while the vertical axis denotes the value K.

In the example of FIG. 1(b), the UCR curve 4c is in the form of a linear expression defined by the equation of K=x=min(CMY) where x is in the range of 0 to MaxK, and K=MaxK where x is in the range of MaxK and 255.

In another example of FIG. 1(c), the UCR curve 4c is in the form of a curve, in which the value of K is zero (0) in the range in which x is smaller than a first threshold value Th1 and the value of K gradually increases toward MaxK with increasing values of x when x is greater than the threshold Th1.

In still another example of FIG. 1(d), the UCR curve 4c is in the form of another curve, in which the value of K is zero (0) in the range in which x is smaller than the first threshold value Th1, the value of K gradually increases toward MaxK when x increases from threshold Th1 to a second threshold value Th2 that is smaller than 255, and then the value of K is fixed at MaxK when x is in the range of the second threshold Th2 to 255.

The PC 20 includes: a CPU 21, a ROM 22, a RAM 23, a hard disk 24 (hereinafter abbreviated to "HDD"), a USB interface 25, USB terminals 26 and 26', and a display 27.

A USB cable is connected to the USB terminal 26. The USB interface 25 is an interface for communicating with an external device through the USB cable. The USB interface 25 is used: to output the CMYK print data (Cink, Mink, Yink, Kink) to the printer 1; to receive RGB image data 24a captured by a digital camera or the like; and to receive RGB image data 24a that has been read in by a scanner function of the printer 1.

Similarly to the RGB image data stored in the external media 40, the RGB image data 24a includes a plurality of RGB value sets (Rin, Gin, Bin) for a plurality of pixels in an image desired to be printed.

A user input device 28, such as a keyboard and a mouse, is connected to the USB terminal 26' via another USB cable. The user can manipulate the user input device 28 to set his/her printing condition while observing the display 27.

The CPU 21 is a microprocessor that executes various programs that are stored in the ROM 22 or the HDD 24. The RAM 23 is memory having a work area that temporarily stores variables and other data while the CPU 21 is executing the various programs.

The HDD 24 is a non-volatile memory device with a large storage capacity. An operating system (OS) and various application programs are stored in the HDD 24. The HDD 24 stores therein the RGB image data 24a, a color conversion program 24b, and a plurality of look-up tables LUT for PC printing 24c.

The color conversion program 24b is a program for converting the RGB value sets (Rin, Gin, Bin) in the RGB image data 24a to CMYK ink amount data sets (Cink, Mink, Yink, Kink) so that the resultant ink amount data sets (Cink, Mink, Yink, Kink) will control the printer 1 to reproduce the image represented by the RGB value sets (Rin, Gin, Bin) in the original RGB image data 24a.

More specifically, the conversion program 24b selects one from among the plurality of look-up tables for PC printing 24c, and uses the selected look-up tables for PC printing 24c to convert each RGB value set (Rin, Gin, Bin) into a CMYK value set (Cout, Mout, Yout, Kout). The conversion program 24b then executes a halftone processing to convert the CMYK value set (Cout, Mout, Yout, Kout) into a CMYK ink amount data set (Cink, Mink, Yink, Kink). The color conversion program 24b then transmits the resultant CMYK ink amount data set (Cink, Mink, Yink, Kink) to the printer 1, which in turn performs printing operation based on the CMYK ink amount data set (Cink, Mink, Yink, Kink) by executing the print control program 4b.

The plurality of look-up tables for PC printing 24c are provided in one to one correspondence with the plurality of different printing conditions. Each look-up table for PC printing 24c is for converting the RGB value sets (Rin, Gin, Bin) into CMYK value sets (Cout, Mout, Yout, Kout). Each look-up table for PC printing 24c is characterized by the corresponding allowable maximum value MaxK for black.

As shown in FIG. 1(f), each look-up table for PC printing 24c is defined for the three-dimensional RGB color grid space in the same manner as the look-up table for media printing 4d. The look-up table for PC printing 24c stores therein a CMYK set value (C, M, Y, K) at each grid point (R, G, B). At all the grid points (R, G, B), the black component values K in the CMYK set values (C, M, Y, K) are smaller than or equal to the corresponding allowable maximum value MaxK for black.

It is noted that the amount of data in a conversion table of a type that converts three-dimensional RGB data into three-dimensional CMY data is much smaller than the amount of data in a conversion table of another type that converts three-dimensional RGB data into four-dimensional CMYK data. For that reason, the look-up table for media printing 4d is of the type that converts RGB data into CMY data, and is stored in the ROM 4 of the printer 1.

The color conversion program 24b and the look-up tables for PC printing 24c are used to enable the printer 1 to print the RGB image data 24a. Data of the color conversion program 24b and the look-up tables for PC printing 24c is therefore originally stored on a data storage medium, such as a CD-ROM or the like. The data storage medium is attached to the printer 1. The printer 1 thus attached with the data storage medium is shipped from the manufacturer. When the user purchases the printer 1, the user reads out the data of the color conversion program 24b and the look-up tables for PC printing 24c from the data storage medium by using a corresponding data-reading device, such as a CD-ROM drive (not shown) mounted in the PC 20, and stores the data in the HDD 24. It is noted that the PC 20 may have a communications interface (not shown) and may be connected directly to a network such as the Internet. Data of the color conversion program 24b and the look-up tables for PC printing 24c may be downloaded to the HDD 24 directly from the network.

The printer 1 is a multifunction device that can perform a printer function, a facsimile function, a copier function, and a scanner function.

Figure 2A:
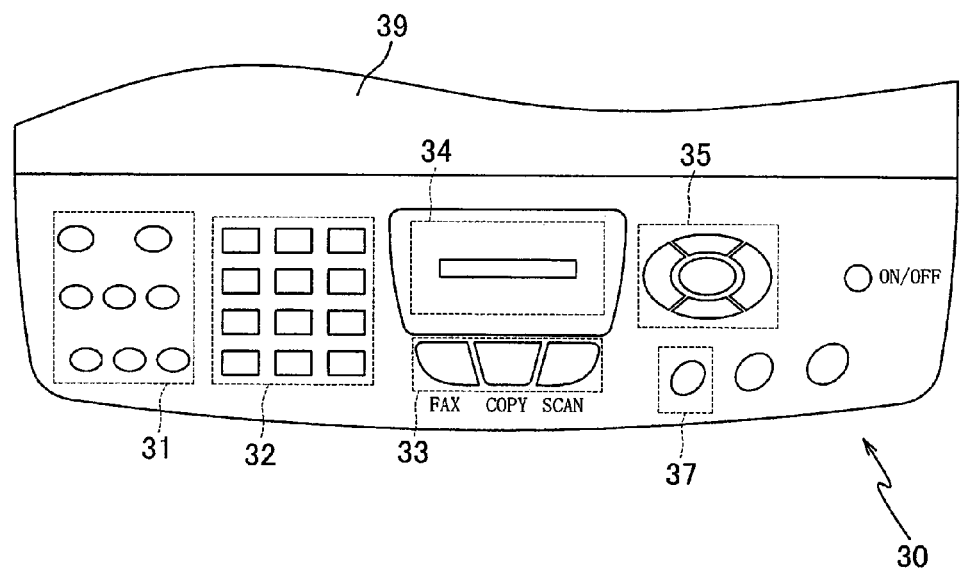
FIG. 2(a) is a partial plan view of an operating panel of the printer of FIG. 1(a)

As shown in FIG. 2(a), the control panel 30 includes: setting switches 31; dialing buttons 32; switches 33; a display portion 34; cursor keys 35; and a start button 37.

The switches 33 are for selecting one of the facsimile function, copier function, and scanner function. It is noted that the printer 1 performs printing operation by executing the print control program 4b when CMYK print data (Cink, Mink, Yink, Kink) is received from the PC 20, regardless of which function is selected.

The setting switches 31 are for executing various settings for those functions.

Dialing buttons 32 are used for operations such as inputting the facsimile number of a remote party when sending a facsimile message to the remote party.

A display portion 34 is configured of a liquid-crystal device. The display portion 34 is for displaying setting status and functions. The cursor keys 35 are used for moving the cursor that is displayed on the display portion 34. A user can select a desirable one from among several functions displayed on the display portion 34 by manipulating cursor keys 35 to move a cursor that is also displayed on the display portion 34.

For example, the display portion 34 displays: at least one ink type that can be used in the printer 1; at least one sheet material type that can be used in the printer 1; and a plurality of printing resolutions, at which the printer 1 can perform printing operation. The user selects one ink type, one sheet material type, and one printing resolution by manipulating the cursor keys 35.

A start button 37 is used for specifying the start of the selected function.

A flat bed 39 has a surface, on which an original is disposed when the printer 1 is used as a copier, facsimile machine, or scanner. The printer 1 reads RGB image data (Rin, Gin, Bin) from the original.

Figure 2B:
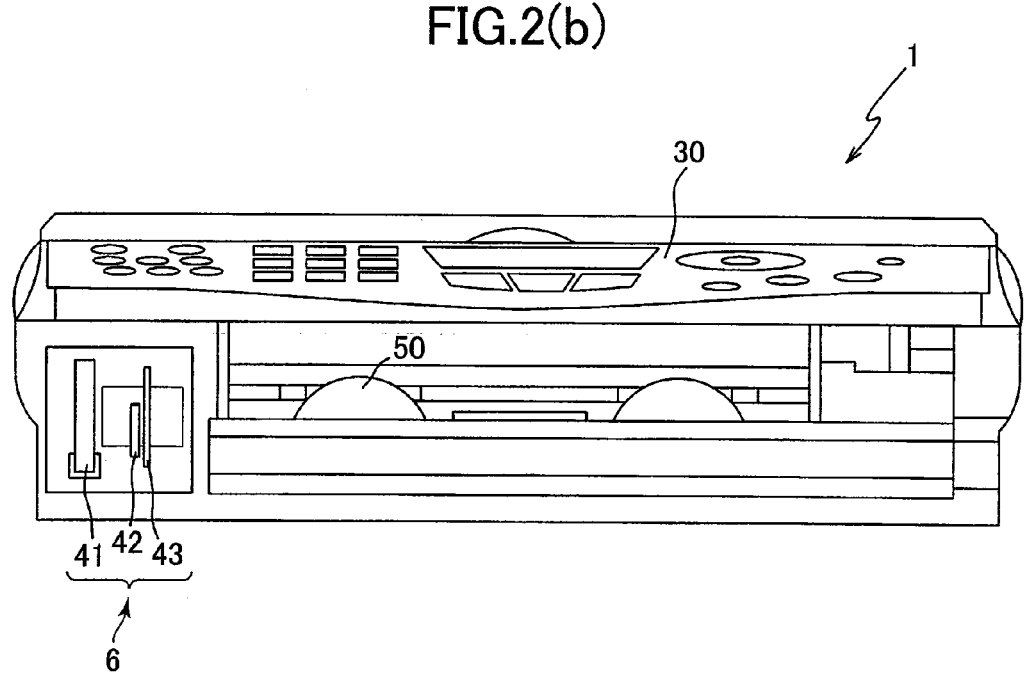
FIG. 2(b) is a front view of the printer.

As shown in FIG. 2(b), a delivery tray 50 and the external media slots 6 are provided on the front of the printer 1. The sheet material is delivered onto the delivery tray 50 after being printed thereon.

Various external media 40 can be inserted into the external media slots 6. In this example, the external media slots 6 include: a slot 41 for compact flash cards (registered trade mark), a slot 42 for memory sticks (registered trade mark), and a slot 43 for smart media cards (registered trade mark).

With the above-described configuration, the system made up from the PC 20 and the printer 1 performs a PC printing. In the PC printing, the PC 20 generates CMYK print data (Cink, Mink, Yink, Kink) based on RGB image data (Rin, Gin, Bin), and transmits the CMYK print data (Cink, Mink, Yink, Kink) to the printer 1. The printer 1 performs printing operation based on the CMYK print data (Cink, Mink, Yink, Kink). The system made up from the PC 20 and the printer 1 also performs a media printing. In the media printing, the printer 1 generates CMYK print data (Cink, Mink, Yink, Kink) based on RGB image data (Rin, Gin, Bin) retrieved from an external medium 40 inserted into one of the external media slots 6. The printer 1 then performs printing operation based on the CMYK print data (Cink, Mink, Yink, Kink).

<PC Printing>

First, the PC printing will be described with reference to FIG. 3(a).

The CPU 21 performs the PC printing by executing the color conversion program 24b. The PC printing is started when the user manipulates the user input device 28 to instruct the PC 20 to start the PC printing. The user selects his/her desired printing condition by manipulating the user input device 28 or the control panel 30, before instructing start of the PC printing.

When the PC printing is started, first, in S1, the CPU 21 sets the user's selected printing condition for the present printing process. The CPU 21 further reads out an RGB value set (Rin, Gin, Bin) for each pixel from the HDD 24.

Next, in S2, the CPU 21 selects one look-up table for PC printing 24c from among the plurality of look-up tables for PC printing 24c, in accordance with the user's selected printing condition for the present printing process. Then, the CPU 21 converts each RGB value set (Rin, Gin, Bin) into a CMYK value set (Cout, Mout, Yout, Kout) by referencing the selected look-up table for PC printing 24c.

More specifically, if some RGB value set (Rin, Gin, Bin) indicates one grid point in the RGB grid color space, the CPU 21 selects a CMYK value set (C, M, Y, K) that corresponds to the subject grid point from the look-up table for PC printing 24c. The CPU 21 simply sets the selected CMYK value set (C, M, Y, K) as a CMYK value set (Cout, Mout, Yout, Kout) for the subject RGB value set (Rin, Gin, Bin).

On the other hand, if some RGB value set (Rin, Gin, Bin) indicates a point other than the grid points in the RGB grid color space, the CPU 21 first selects several grid points that surround the subject point therein, and calculates a CMYK value set (Cout, Mout, Yout, Kout) by interpolating CMYK value sets (C, M, Y, K) at those several grid points with using a method such as linear interpolation.

Next, in S3, the CPU 21 performs a halftone processing to convert the CMYK value set (Cout, Mout, Yout, Kout) into a CMYK ink amount data (Cink, Mink, Yink, Kink). The CPU 21 performs this halftone processing by executing an error-diffusion processing or a dither processing.

Next, in S4, the CPU 21 outputs the CMYK ink amount data (Cink, Mink, Yink, Kink) as CMYK print data to the printer 1, which in turn will perform printing operation based on the CMYK ink amount data (Cink, Mink, Yink, Kink) by executing the print control program 4b.

<Media Printing>

Next, the media printing will be described with reference to FIG. 3(b).

The CPU 2 performs the media printing by executing the color conversion program 4a. The media printing is started when the user manipulates the control panel 30 to instruct the printer 1 to start the media printing. The user selects his/her desired printing condition by manipulating the control panel 30, before instructing start of the media printing.

When the media printing is started, first, in S5, the CPU 2 sets the user's selected printing condition for the present printing process. The CPU 2 further reads out an RGB value set (Rin, Gin, Bin) for each pixel from an external medium 40 inserted in one of the external media slots 6.

Next, in S6, the CPU 2 selects one look-up table for media printing 4d from among the plurality of look-up tables for media printing 4d in accordance with the user's selected printing condition for the present printing process. The CPU 2 then converts each RGB value set (Rin, Gin, Bin) into a CMY value set (Cin, Min, Yin) by referencing the selected look-up table for media printing 4d.

More specifically, if some RGB value set (Rin, Gin, Bin) indicates some grid point in the RGB grid color space, the CPU 2 selects a CMY value set (C, M, Y) that corresponds to the subject grid point from the look-up table for media printing 4d. The CPU 2 simply sets the selected CMY value set (C, M, Y) as a CMY value set (Cin, Min, Yin) for the subject RGB value set (Rin, Gin, Bin).

On the other hand, if some RGB value set (Rin, Gin, Bin) indicates a point other than the grid points in the RGB grid color space, the CPU 2 first selects several grid points that surround the subject point therein, and calculates a CMY value set (Cin, Min, Yin) by interpolating CMY value sets (C, M, Y) at those several grid points with using a method such as linear interpolation.

Next, in S7, the CPU 2 selects one UCR curve 4c from among the plurality of UCR curves 4c, in accordance with the user's selected printing condition. The CPU 2 then performs a UCR process in a manner described below.

First, the CPU 2 determines, for each pixel, the black component value Kout by referring to the selected UCR curve 4c based on the corresponding CMY value set (Cin, Min, Yin).

More specifically, the CPU 2 first determines the smallest value "minCMY" among the CMY values Cin, Min, and Yin in the CMY value set (Cin, Min, Yin) for the subject pixel. Then, the CPU 2 refers to the selected UCR curve 4c, and selects the value K that corresponds to the value minCMY on the UCR curve 4c. The CPU 2 then sets the selected value K as the value Kout.

Then, the CPU 2 corrects the values Cin, Min, and Yin into corrected values Cout, Mout, and Yout based on the value Kout, by calculating the following equations:

$Cout = Cin - Kout$, $Mout = Min - Kout$, and $Yout = Yin - Kout$.

Once the CMYK data (Cout, Mout, Yout, Kout) has been obtained, the program proceeds to a halftone process of S8, in which the CMYK data (Cout, Mout, Yout, Kout) is converted into CMYK ink amount data (Cink, Mink, Yink, Kink) in the same manner as in S3 of FIG. 3(a).

Next, the CPU 2 executes a printing process in S9 based on the CMYK ink amount data (Cink, Mink, Yink, Kink) by executing the print control program 4b.

<How to Create Conversion Tables>

Next will be described how the manufacturer of the printer 1 creates the UCR curves 4c, the look-up-tables for media printing 4d, and the look-up tables for PC printing 24c for the plurality of different printing conditions.

It is noted that the manufacturer first determines the allowable maximum value MaxK for black for each printing condition, before creating the UCR curve 4c, the look-up-table for media printing 4d, and the look-up table for PC printing 24c for the subject printing condition.

<How to Determine MaxK>

Next will be described, with reference to FIGS. 4(a) to 6, how to determine the value MaxK under one printing condition.

First, the printer 1 is controlled to print, under the present printing condition, a plurality of (seventeen, in this example) color samples No. 1 to No. 17 by using the plurality of (seventeen) CMYK value sets (Cout, Mout, Yout, Kout). That is, the plurality of (seventeen) CMYK value sets (Cout, Mout, Yout, Kout) are first subjected to a halftone processing in the same manner as in S8, and resultant CMYK ink amount data sets (Cink, Mink, Yink, Kink) are printed. As shown in FIG. 4(a), the color samples No. 1 to No. 17 are printed as being arranged successively from left to right in a band shape.

The seventeen CMYK value sets (Cout, Mout, Yout, Kout) include: a first CMYK value set (0, 0, 0, 255); a second CMYK value set (16, 16, 16, 240); a third CMYK value set (32, 32, 32, 224); a fourth CMYK value set (48, 48, 48, 208); a fourteenth CMYK value set (208, 208, 208, 48), a fifteenth CMYK value set (224, 224, 224, 32), a sixteenth CMYK value set (240, 240, 240, 16), and a seventeenth CMYK value set (255, 255, 255, 0). In each CMYK value set (Cout, Mout, Yout, Kout), the values Cout, Mout, and Yout are equal to one another. As the CMYK value set (Cout, Mout, Yout, Kout) shifts from the first to the seventeenth, the values Cout, Mout, and Yout increment by the unit of 16, while the value Kout decrements also by the unit of 16. The color sample No. 17 is therefore printed by using cyan, magenta, and yellow inks only, while the other remaining color samples No. 1-No. 16 are printed by all of the cyan, magenta, yellow, and black inks.

More specifically, as shown in FIG. 4(b), the amount of black ink used to create the color sample increases gradually from the color sample No. 17 to the color sample No. 1, while the amounts of cyan, magenta, and yellow inks used to create the color samples decreases gradually from the color sample No. 17 to the color sample No. 1. In other words, the ratio of the black ink amount with respect to the cyan, magenta, and yellow ink amounts gradually increases from the color sample No. 17 to the color sample No. 1 by a fixed amount of rate.

Next, glossiness of all the seventeen color samples No. 1-No. 17 are measured by using a glossiness-measuring device. A representative example of the glossiness-measuring device includes a digital variable-angle gloss meter (UGV-5K (trade name)) manufactured by "Suga Instruments". The glossiness of the color samples may preferably be measured by setting a measuring angle of 45 degrees, for example, when using the digital variable-angle gloss meter (UGV-5K (trade name)).

The glossiness exhibited by the color sample No. 17 created by using no black ink will be referred to as "reference glossiness" hereinafter. The black ink is pigment-based one, but the cyan, magenta, and yellow inks are dye-based ones. Accordingly, color samples created by using relatively large amounts of black inks will possibly fail to exhibit the same glossiness with the color sample No. 17.

Figure 5:
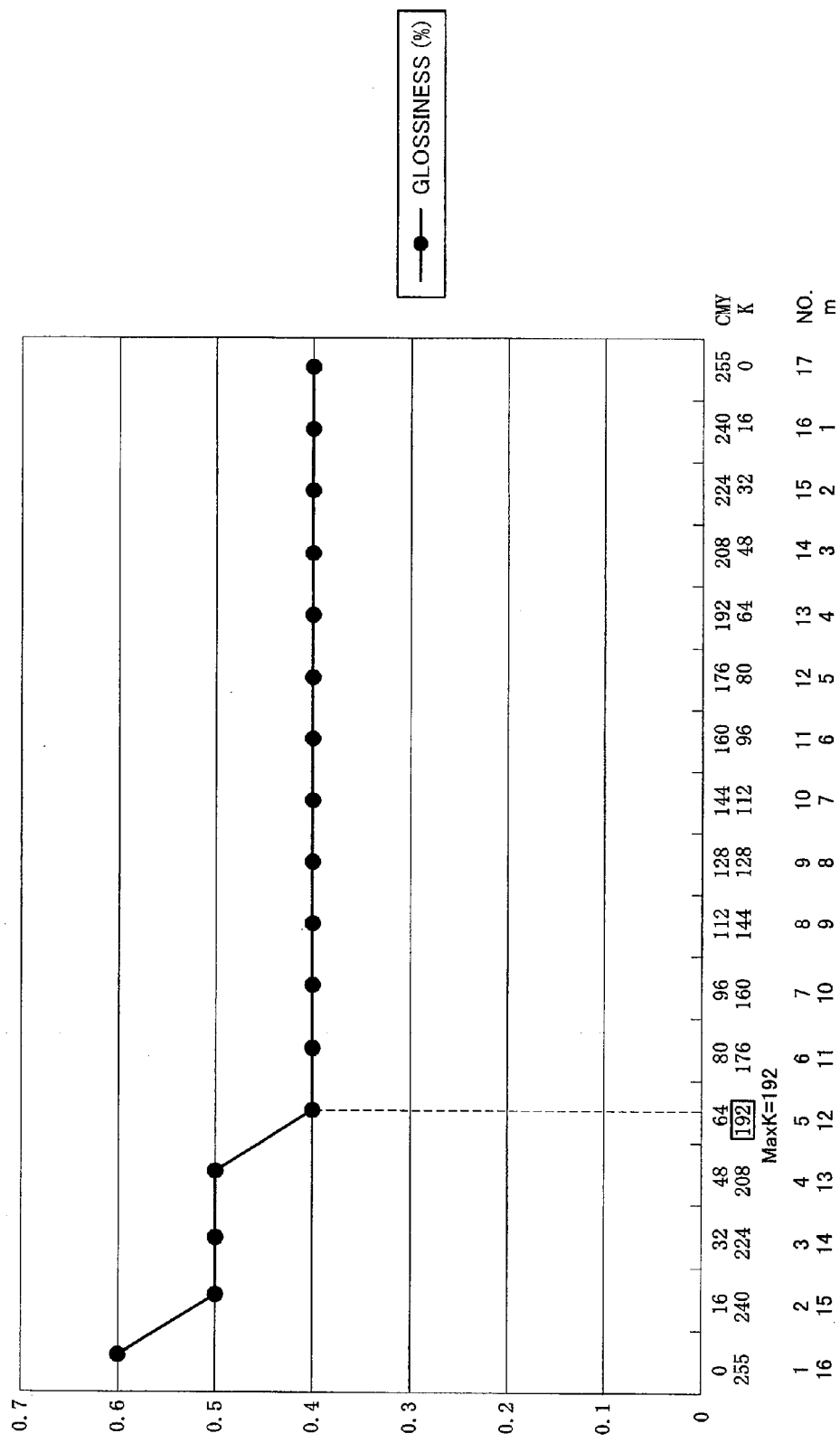
FIG. 5 is a graph of glossiness of the color samples shown in FIG. 4(a)

FIG. 5 is a graph showing one example of the measurement results of the glossiness for the color samples No. 1-No. 17. The color samples No. 1-No. 17 are indicated in the horizontal axis, and the glossiness (%) is indicated in the vertical axis. As apparent from FIG. 5, the color sample No. 17 exhibit the reference glossiness of 0.4%. The color samples No. 16-No. 5 exhibits substantially the same glossiness with the reference glossiness of 0.4%. However, the color samples No. 4-No. 1 exhibit glossiness greater than the reference glossiness of 0.4%. More specifically, the glossiness gradually increases from the color sample No. 4 to the color sample No. 1.

Figure 6:
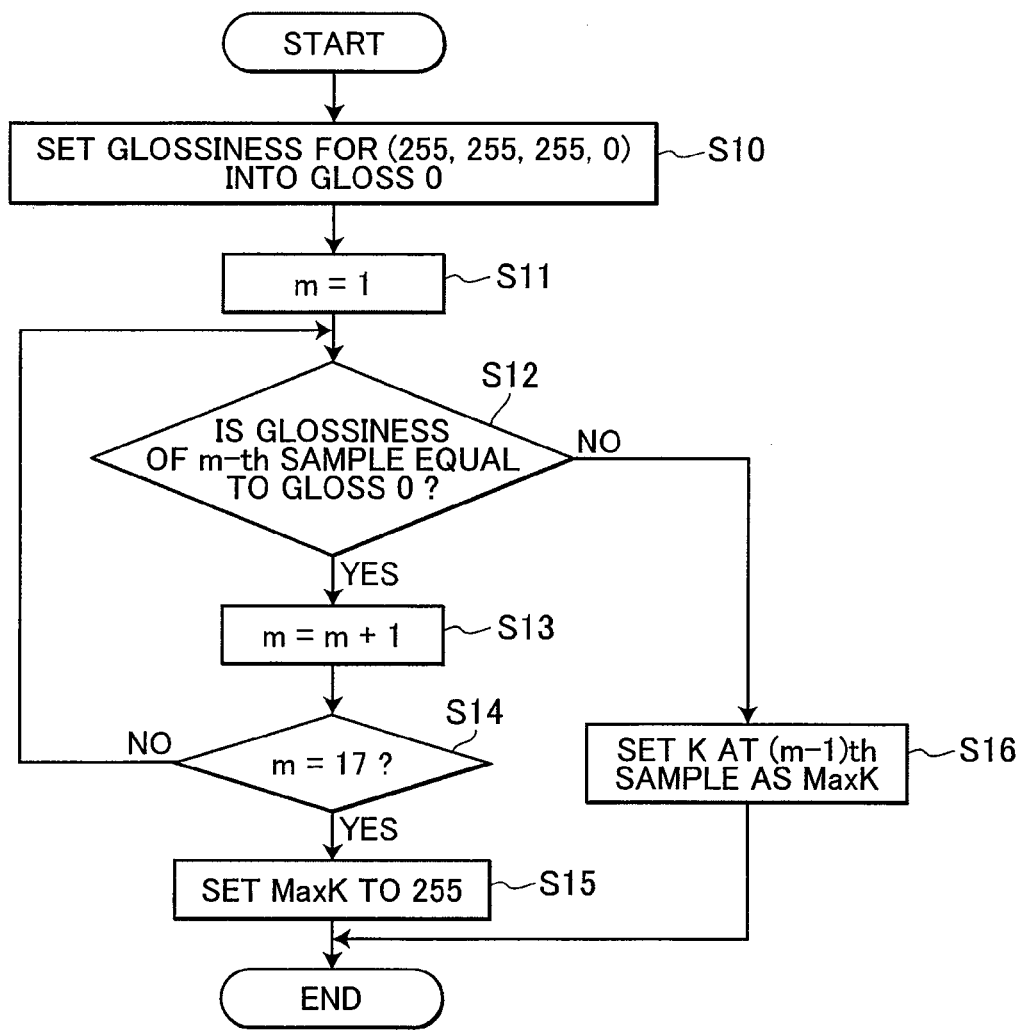
FIG. 6 is a flowchart of the processing for setting a maxim value MaxK for black.

The allowable maximum value MaxK for black is determined, in a manner shown in FIG. 6, based on the measurement results of the glossiness of the color samples No. 1-No. 17. The process of FIG. 6 is executed by a computer located at the factory of the manufacturer, for example.

First, in S10, the value of the reference glossiness (0.4% in the example of FIG. 5) is set into a variable "gloss0".

Next, in S11, a variable m is initialized to one (1).

In S12, one color sample, whose sample number No. is determined by subtracting the present variable "m" from the total sample number (17), is selected. FIG. 5 shows the correspondence between the sample Nos. and the variables "m". Also in S12, the glossiness of the selected color sample No. (=17-m) is compared with the value "gloss0".

Accordingly, first, the glossiness of the color sample No. 16, which is created by the CMYK color data (240, 240, 240, 16), is compared with the glossiness of the color sample No. 17, which is created by the CMYK color data (255, 255, 255, 0).

If the glossiness of the present color sample No.(=17-m) is equal to the value "gloss0" (Yes in S12), in S13, the value m is incremented by one (1).

In S14, it is determined whether or not the value of m reaches 17. When the value of m has not yet reached 17 (No in S14), the flow returns to the processing of S12, in which the glossiness of the next color sample is compared with the value "gloss0".

If the glossiness of the current color sample No. (=17-m) differs from the value "gloss0" (No in S12), in S16, the value Kout that has been used when creating the previous color sample, whose sample No. satisfies the equation of No.=17-(m-1), is set as the allowable maximum value MaxK. Then, the processing ends.

On the other hand, when the value m has reached 17 (Yes in S14), it is known that all of the color samples No. 16-No. 1 (m=1-16) exhibit glossiness the same as the color sample No. 17. Accordingly, in S15, the allowable maximum value MaxK is set to 255, and the processing ends.

In the example of FIG. 5, as the glossiness of the color samples is compared with the reference glossiness in succession from the color sample with m of 1 (color sample No. 16) toward the color sample with m of 16 (color sample No. 1), the glossiness of the color sample with m of 13, that is, the color sample No. 4 first becomes different from the reference glossiness (no in S12). Accordingly, the black data Kout of 192 in the CMYK value set (64, 64, 64, 192) for the color sample with m−1 of 12, that is, the color sample No. 5 is set as the allowable maximum value Kout.

In the above description, the glossiness of the color samples No. 1-No. 17 is measured and the value MaxK is determined based on the measured glossiness values. However, gloss of the color samples No. 1-No. 17 may be visually examined and the value MaxK is determined based on the visually-examined results.

More specifically, as shown in FIG. 4(a), the color samples No. 17-No. 1 are arranged in this order from the right to the left. The color samples No. 16-No. 1 are successively compared in this order with the color sample No. 17. One or more successive color samples that appear exhibiting the same gloss with the right-edged, color sample No. 17 are determined. One color sample that is located at the leftmost edge among the one or more successive color samples of the same gloss is selected. The black value Kout that has been used when creating the selected color sample is determined as MaxK.

In this way, one or more color samples that are printed by cyan, magenta, yellow, and black inks and that successfully exhibit substantially the same gloss with the gloss of the color sample that is printed by cyan, magenta, and yellow inks only are first determined. Then, from among those successful color samples, one color sample, which is created by the largest amount of black ink, is selected. The black data Kout that has been used when creating the selected color sample is set as the allowable maximum value MaxK for the black component.

In the example of FIG. 5, color samples No. 16-No. 5 successfully exhibit the same gloss with the color sample No. 17. The color sample No. 5 is created by the largest amount of black ink within the color samples No. 16-No. 5. The black data Kout of 192 that has been used when creating the color sample No. 5 is therefore set as the allowable maximum value MaxK for the black component.

To summarize, in order to determine the allowable maximum value MaxK for black, color samples are created by successively varying the amounts of the black component and the CMY components by small amounts. One or more successive color samples that are formed of not only CMY components but also K component exhibit substantially the same gloss as the color sample that is formed of CMY inks only. Accordingly, from among the one or more successive color samples, one color sample that is created by the maximum value Kout is selected visually or by using the glossiness-measuring device. Then, the black component value Kout that has been used when creating the selected color sample is set as the allowable maximum value MaxK for black.

The above-described processing to determine the allowable maximum value MaxK is executed repeatedly while changing the printing condition. That is, the plurality of color samples are printed under one printing condition, and gloss of the color samples are examined to determine the allowable maximum value MaxK for black for the subject printing condition. Then, the plurality of color samples are printed under another printing condition, and gloss of the color samples are examined to determine the allowable maximum value MaxK for black for the subject printing condition. These operations are repeated for all of the plurality of different printing conditions that will possibly be set by a user on the control panel 30 or on the user input device 28. Thus, the allowable maximum value MaxK for black is set for each of all the plurality of different printing conditions.

<How to Create UCR Curves 4c>

The UCR curves 4c for the plurality of different printing conditions are created based on the allowable maximum values MaxK for black for the printing conditions, respectively.

Next will be described, with reference to FIG. 7, how to create the UCR curves 4c for the plurality of printing conditions based on the corresponding allowable maximum values MaxK for black.

Now assume that two different allowable maximum values MaxK1 and MaxK2 are determined in the above-described processings under two (first and second) different printing conditions. The value MaxK1 is greater than the MaxK2.

In such a case, one UCR curve 4c (4c-1) for the first printing condition is determined by using the allowable maximum value MaxK1, and another UCR curve 4c (4c-2) for the second printing condition is determined based on the allowable maximum value MaxK2.

Figure 7A:
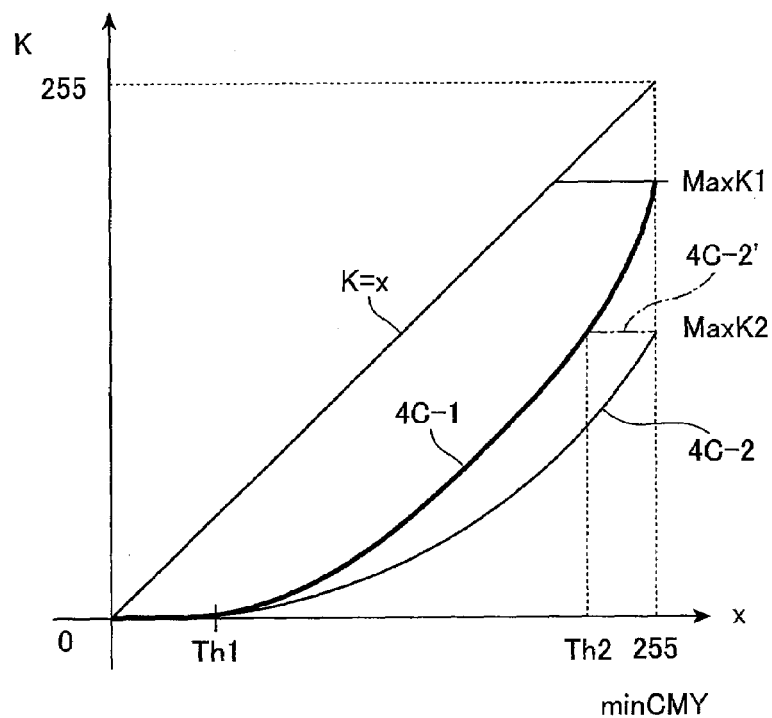
FIG. 7(a) is a graph showing an example of how to create UCR curves for media printing.

For example, the UCR curves 4c-1 and 4c-2 may be set as shown in FIG. 7(a). In the UCR curve 4c-1, the value K is zero (0) when the minimum value minCMY is in the range of 0 to Th1 and the value K gradually increases toward the value MaxK1 when the minimum value minCMY increases from the value Th1 to the value 255. Similarly, in the UCR curve 4c-2, the value K is zero (0) when the minimum value minCMY is in the range of 0 to Th1 and the value K gradually increases toward the value MaxK2 when the minimum value minCMY increases from the value Th1 to the value 255.

However, the UCR curve 4c-2 may be modified into a UCR curve 4c-2' as indicated by a broken line in the figure. The UCR curve 4c-2' has the same characteristics as the UCR curve 4c-1 when x (=minCMY) is in the range of 0 to Th2. When x is Th2, the value K reaches the allowable maximum value MaxK2. When x (=minCMY) is in the range of Th2 and 255, the value K is fixed at the value MaxK2.

Figure 7B:
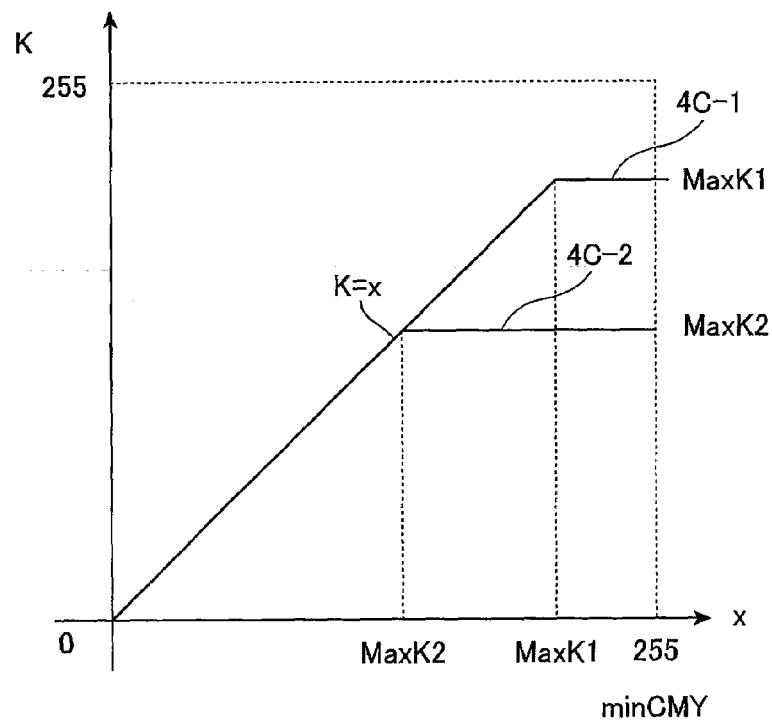
FIG. 7(b) is a graph showing another example of how to create the UCR curves for media printing.

Or, the UCR curves 4c-1 and 4c-2 may be set as shown in FIG. 7(b). In this case, the UCR curve 4c-1 satisfies the equation of K=x=minCMY when x is between 0 and MaxK1 and satisfies the equation of K=MaxK1 when x is between MaxK1 and 255. Similarly, the UCR curve 4c-2 satisfies the equation of K=x=minCMY when x is between 0 and MaxK2 and satisfies the equation of K=MaxK2 when x is between MaxK2 and 255.

The UCR curves 4c are set for all of the plurality of different printing conditions based on the corresponding allowable maximum values MaxK. Data of the thus created UCR curves 4c is stored in the ROM 4 of the printer 1.

<How to Create Look-Up Tables for Media Printing 4d>

The look-up tables for media printing 4d for the plurality of printing conditions are created based on the UCR curves 4c that have been set for the respective printing conditions.

Next will be described how to create the look-up table for media printing 4d for each printing condition based on the corresponding UCR curve 4c.

First, a CMY-Lab profile is created by using the corresponding UCR curve 4c in a manner described below. The CMY-Lab profile is indicative of the relationship between a plurality of CMY value sets (Cin, Min, Yin) and $L^*a^*b^*$ value sets ($L^*$, $a^*$, $b^*$), which are defined in a predetermined device-independent Lab color space.

That is, a plurality of CMY value sets (Cin, Min, Yin) are subjected to the UCR process by using the UCR curve 4c in the same manner as in S7, and are subjected to the halftone process in the same manner as in S8. As a result, the plurality of CMY value sets (Cin, Min, Yin) are converted into a plurality of CMYK ink amount data sets (Cink, Mink, Yink, Kink). The printer 1 is controlled to print a plurality of color samples based on the CMYK ink amount data sets (Cink, Mink, Yink, Kink). Then, a calorimeter is used to measure the Lab value sets ($L^*$, $a^*$, $b^*$) for the colors of the color samples. The CMY-Lab profile is produced by interconnecting the plurality of CMY value sets (Cin, Min, Yin) and the measured Lab value sets ($L^*$, $a^*$, $b^*$).

Next, the look-up table 4d is created based on the CMY-Lab profile and on a predetermined RGB-Lab profile. The RGB-Lab profile is indicative of the relationship between a plurality of ($17^3$, in this example) RGB value sets (R, G, B) and $L^*a^*b^*$ value sets ($L^*$, $a^*$, $b^*$). The RGB-Lab profile indicates what $L^*a^*b^*$ value set ($L^*$, $a^*$, $b^*$) should be obtained in response to each RGB value set (R G, B). The resultant look-up table for media printing 4d lists up CMY values (C, M, Y) in correspondence with the plurality of ($17^3$, in this example) grid points (R, G, B) with $17^3$ grid numbers of 0 to $17^3$.

The look-up tables for media printing 4d are set for all of the plurality of different printing conditions based on the corresponding UCR curves 4c. Data of the thus created look-up tables for media printing 4d is stored in the ROM 4 of the printer 1.

During the media printing process of FIG. 3(b), under one printing condition, by using the look-up table for media printing 4d for the subject printing condition in S6 and by using the UCR curve 4c for the subject printing condition in S7, it is ensured that colors obtained by cyan, magenta, yellow, and black inks will exhibit substantially the same gloss with colors obtained by cyan, magenta, and yellow inks only. The media printing can be executed without generating undesirable false contours. By determining in S7 the CMY values Cout, Mout, Yout based on the difference between the CMY values Cin, Min, Yin and the black value Kout that is set smaller than or equal to the allowable maximum value MaxK for black for the present printing condition, the obtained CMYK value set (Cout, Mout, Yout, Kout) will faithfully reproduce the color of the original RGB data set (Rin, Gin, Bin).

<How to Create Look-Up Tables for PC Printing 24c>

The look-up tables for PC printing 24c for the plurality of printing conditions are created based on the allowable maximum values MaxK that have been determined for the respective printing conditions.

Next will be described how to create the look-up table for PC printing 24c for each printing condition based on the corresponding allowable maximum value MaxK.

First, a CMYK-Lab profile is created in a manner described below. The CMYK-Lab profile is indicative of the relationship between a plurality of CMYK value sets (Cout, Mout, Yout, Kout) and a plurality of $L^*a^*b^*$ value sets ($L^*$, $a^*$, $b^*$).

That is, a plurality of CMYK value sets (Cout, Mout, Yout, Kout) are converted into a plurality of CMYK ink amount data sets (Cink, Mink, Yink, Kink) through the halftone process in the same manner as in S3. The printer 1 is controlled to print a plurality of color samples based on the CMYK ink amount data sets (Cink, Mink, Yink, Kink). Then, a calorimeter is used to measure the Lab value sets ($L^*$, $a^*$, $b^*$) for the colors of the color samples. The CMYK-Lab profile is produced by interconnecting the plurality of CMYK value sets (Cout, Mout, Yout, Kout) and the measured Lab value sets ($L^*$, $a^*$, $b^*$).

Next, the look-up table 24c is created based on the CMYK-Lab profile and on the predetermined RGB-Lab profile. The resultant look-up table for PC printing 24c is created to list up CMYK values (C, M, Y, K) in correspondence with the plurality of ($17^3$, in this example) grid points (R, G, B) with $17^3$ grid numbers of 0 to $17^3$.

Figure 8:
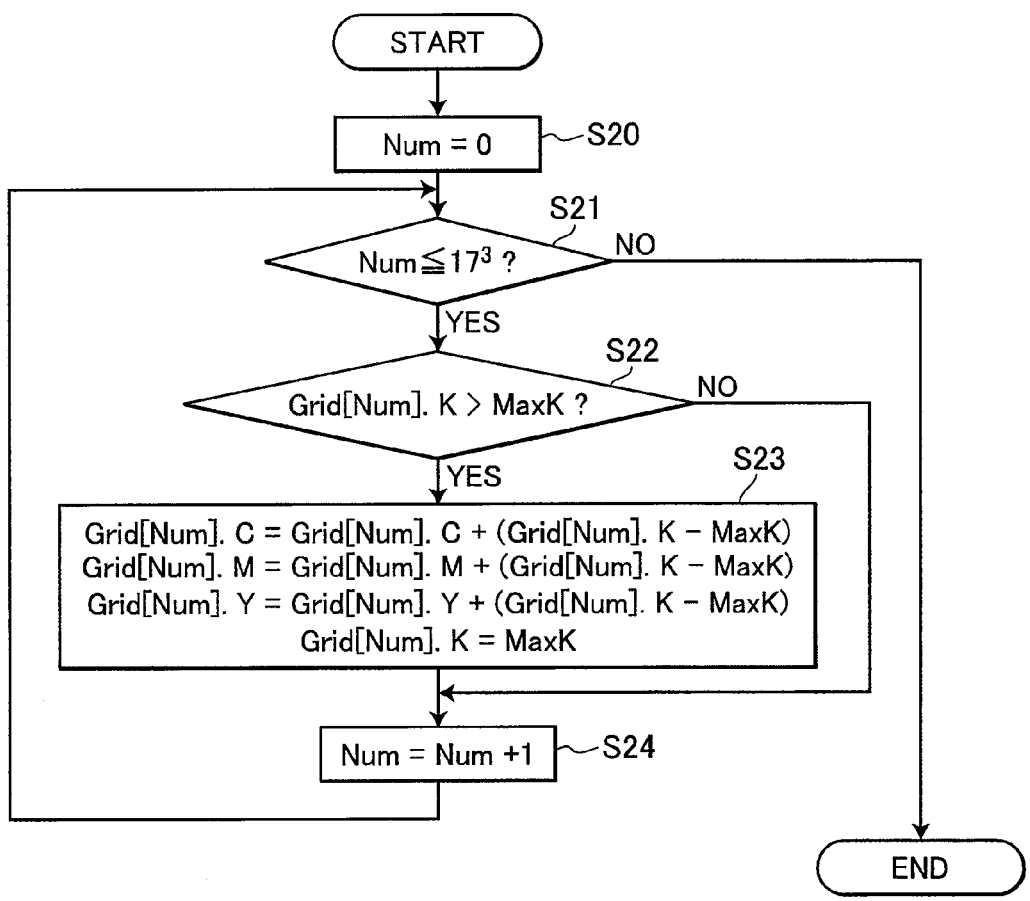
FIG. 8 is a flowchart of the processing for correcting CMYK values in the look-up table for PC printing.

Next, the look-up table 24c is corrected in a manner shown in FIG. 8 based on the corresponding allowable maximum value MaxK for black. The process of FIG. 8 is executed by a computer located at the factory of the manufacturer, for example.

That is, first, in S20, a variable Num, which indicates a grid number, to zero (0).

Next, in S21, it is judged whether or not the present value "Num" is less than or equal to the value $17^3$.

When the value Num is smaller than or equal to the value $17^3$ (Yes in S21), it is known that the processing has not yet completed for all the grid points.

Accordingly, the process proceeds to S22, in which it is judged whether or not the value of K in the CMYK value set (C, M, Y, K) at the grid number Num is greater than the value MaxK.

If the value K is greater than the value MaxK (Yes in S22), in S23, all the values C, M, Y, and K in the CMYK value set (C, M, Y, K) at the grid number Num are corrected into values C', M', Y', and K' according to the following equations:

$$C' = C + (K - \text{Max}K),$$

$$M' = M + (K - \text{Max}K),$$

$$Y' = Y + (K - \text{Max}K),$$

and $$K' = \text{Max}K.$$

The thus corrected values C', M', Y', and K' are newly set as the values C, M, Y, and K.

Then, the process proceeds to S24, in which the value Num is incremented by one (1).

On the other hand, if the value K is smaller than or equal to the value MaxK (No in S22), the process directly proceeds from S22 to S24. Accordingly, the value Num is incremented by one (1) without correcting the values C, M, Y, K at the grid point with the grid number Nm.

Then, the process returns from S24 to S21.

When the value Num becomes greater than the value 173 (No in S21), the processing of correcting the look-up table 24c ends.

In this manner, the values C, M, Y, K at all the grid points in the look-up table 24c are corrected dependently on the value MaxK. The corrected look-up table 24c ensures that colors obtained by cyan, magenta, yellow, and black inks will exhibit substantially the same gloss with colors obtained by cyan, magenta, and yellow inks only.

The look-up tables for media printing 24c are thus created and corrected for all the plurality of different printing conditions based on the corresponding allowable maximum values MaxK for black. Thereafter, data of the look-up tables for media printing 24c is stored in the data storage medium, which will be attached to the printer 1.

During the PC printing process of FIG. 3(a), by using the thus created-and-corrected look-up tables for media printing 24c in S2, it is ensured that colors obtained by cyan, magenta, yellow, and black inks will exhibit substantially the same gloss with colors obtained by cyan, magenta, and yellow inks only. The PC printing can be executed without generating undesirable false contours.

Second Embodiment

In the first embodiment, the ROM 4 in the printer 1 is prestored with the plurality of UCR curves 4c, each of which corresponds to one printing condition and each of which has its value K not exceeding the value MaxK. The ROM 4 in the printer 1 is prestored with the plurality of look-up tables for media printing 4d, each of which corresponds to one UCR curve 4c. The HDD 24 in the PC 20 stores therein the plurality of look-up tables 24c, each of which corresponds to one printing condition and each of which has CMYK value sets (C, M, Y, K), with the value K not exceeding the value MaxK, at all the grid points (R, G, B).

Figure 9A:
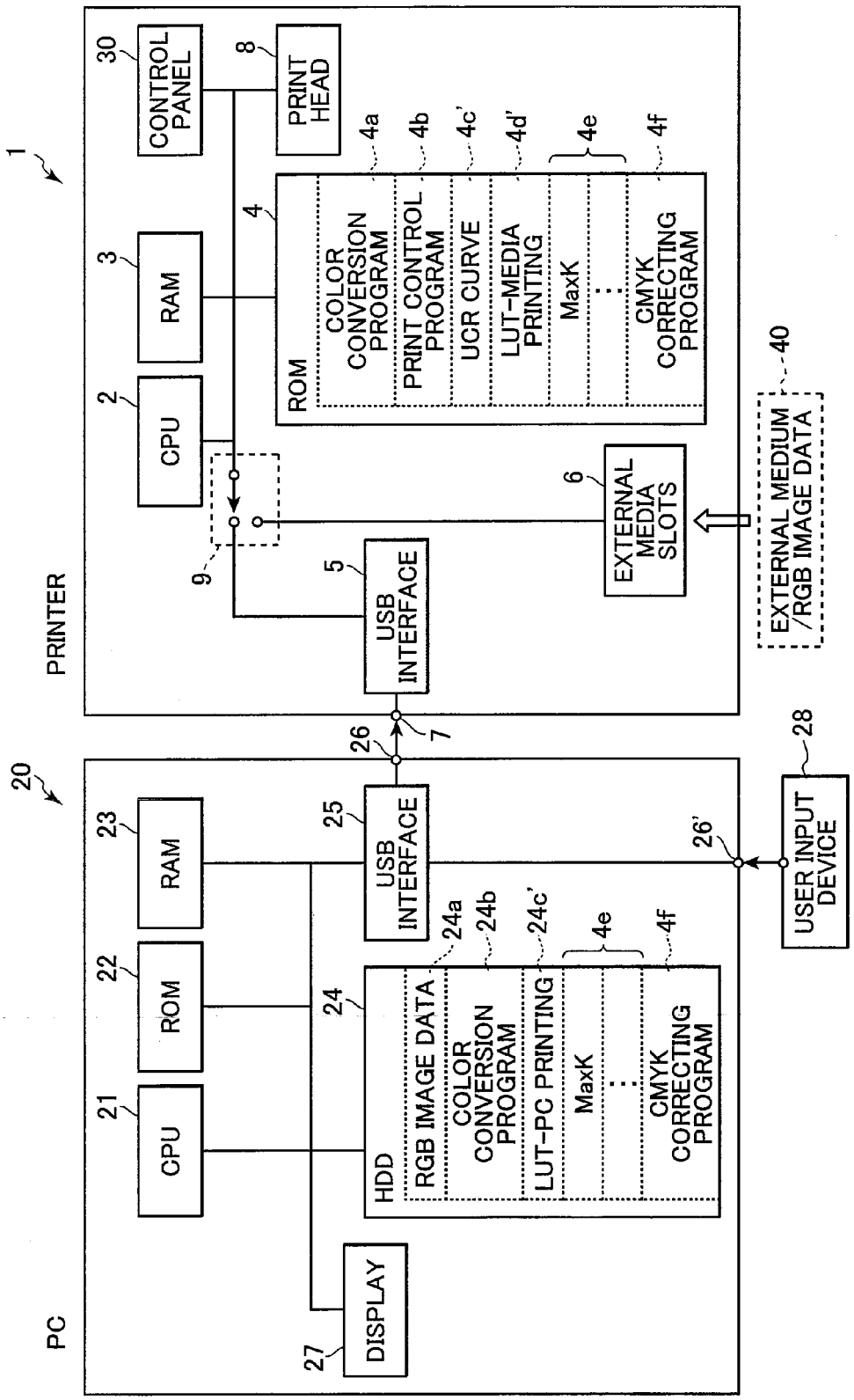
FIG. 9(a) is a block diagram of the electrical configuration of the personal computer (PC) and the printer in accordance with a second embodiment of the present invention.

Contrarily, according to the second embodiment, as shown in FIG. 9(a), the ROM 4 in the printer 1 is prestored with: a single UCR curve 4c'; a single look-up table for media printing 4d'; data 4e of the plurality of allowable maximum values MaxK for black; and a CMYK correcting program 4f. The plurality of allowable maximum values MaxK for black are in one to one correspondence with the plurality of different printing conditions.

The HDD 24 in the PC 20 stores therein a single look-up table for PC printing 24c'. The HDD 24 stores therein data 4e of the plurality of allowable maximum values MaxK for black and the CMYK correcting program 4f in the same manner as the ROM 4 in the printer 1.

The plurality of allowable maximum values MaxK for black is determined by the manufacturer of the printer 1 in the same manner as described in the first embodiment.

Figure 9B:
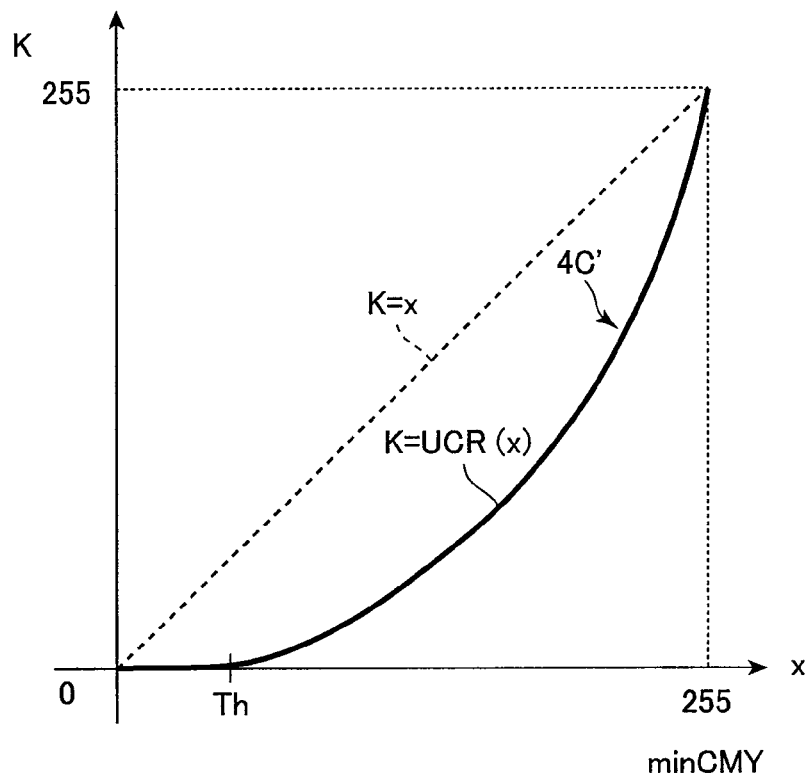
FIG. 9(b) is an example of a single UCR curve for media printing according to the second embodiment.

A representative example of the UCR curve 4c' is shown in FIG. 9(b). As shown in FIG. 9(b), according to the UCR curve 4c', the value K is maintained at zero (0) when the value x (=minCMY) is smaller than or equal to the threshold Th, and the value K gradually increases toward the value 255 as the value minCMY increases from the threshold Th to the value 255.

Or, the UCR curve 4c' may have the linear characteristics of K=x (=minCMY) in the entire range of 0 to 255, as indicated by a broken line in FIG. 9(b).

The look-up table for media printing 4d' has the same configuration as the look-up table for media printing 4d of the first embodiment shown in FIG. 1(e).

It is noted that the look-up table for media printing 4d' is created by the manufacturer based on the UCR curve 4c' in a manner the same as that in which the look-up table for media printing 4d is created based on the corresponding UCR curve 4c in the first embodiment.

The look-up table for PC printing 24c' has the same configuration as the look-up table for PC printing 24c of the first embodiment shown in FIG. 1(f).

It is noted that the look-up table for PC printing 24c' is created by the manufacturer in a manner the same as that in which the look-up table for PC printing 24c is created in the first embodiment except that the look-up table for PC printing 24c' is not corrected through the process of FIG. 8 in the first embodiment.

Data of the color conversion program 24b, the look-up table for PC printing 24c', the allowable maximum values MaxK for black 4e, and the CMYK correcting program 4f is stored in a data storage medium. The printer 1 attached with the data storage medium is shipped from the manufacturer. When the user purchases the printer 1, the user loads data of the color conversion program 24b, the look-up table for PC printing 24c', the allowable maximum values MaxK for black 4e, and the CMYK correcting program 4f into the HDD 24. Or, data of the color conversion program 24b, the look-up table for PC printing 24c', the allowable maximum values MaxK for black 4e, and the CMYK correcting program 4f may be downloaded into the HDD 24 directly from the network such as the Internet.

Figure 9C:
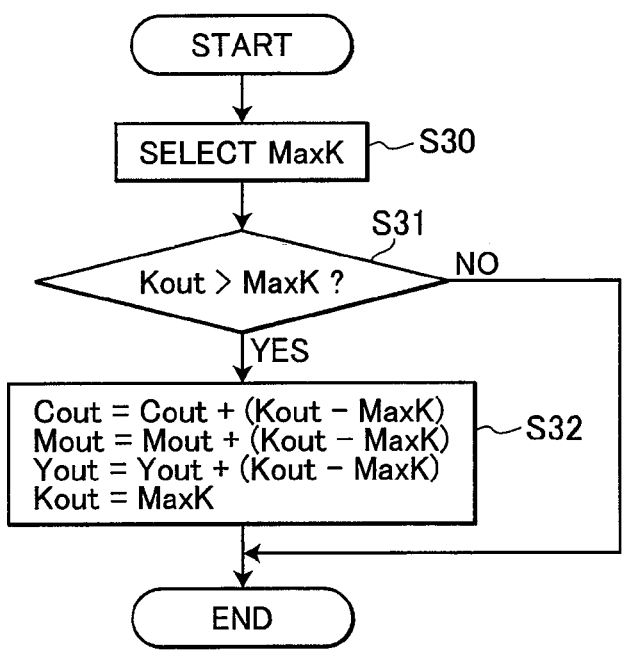
FIG. 9(c) is a flowchart of the processing for correcting the CMYK value sets in accordance with the second embodiment.

According to the present embodiment, a CMYK correcting process of FIG. 9(c) is additionally executed during each of the PC printing of FIG. 3(a) and the media printing of FIG. 3(b).

That is, the CMYK correcting process of FIG. 9(c) is executed after S2 and before S3 during the PC printing of FIG. 3(a), and after S7 and before S8 during the media printing of FIG. 3(b).

It is noted that in the present embodiment, because only the single look-up table 24c' is stored in the HDD 24, the RGB value sets (Rin, Gin, Bin) are converted in S2 to the CMYK value sets (Cout, Mout, Yout, Kout) by using the single look-up table 24c'. Similarly, because only the single look-up table 4d' and the single UCR curve 4c' are stored in the ROM 4, the RGB value sets (Rin, Gin, Bin) are converted in S7 and S8 to the CMYK value sets (Cout, Mout, Yout, Kout) by using the single look-up table 4d' in S6 and by using the single UCR curve 4c' in S7.

The CMYK correcting process of FIG. 9(c) will be described below in greater detail for the case where the CMYK correcting process is executed after S2 and before S3 in FIG. 3(a). In this case, the PC 20 performs the CMYK correcting process of FIG. 9(c) by executing the CMYK correcting program 4f in the HDD 24.

First, in S30, the CPU 21 selects, from among data of the plurality of allowable maximum values MaxK for black 4e, one allowable maximum value MaxK that corresponds to the user's selected printing condition for the present printing process.

Next, in S31, the CPU 21 judges whether or not the value Kout in the CMYK value set (Cout, Mout, Yout, Kout) that is produced in S2 for each pixel is greater than the value of MaxK.

If the value Kout for some pixel is greater then the value MaxK (Yes in S31), in S32, the values Cout, Mout, Yout, and Kout for the subject pixel are corrected into values Cout', Mout', Yout', and Kout' according to the following equations:

$$Cout' = Cout + (Kout - MaxK),$$

$$Mout' = Mout + (Kout - MaxK),$$

$$Yout' = Yout + (Kout - MaxK),$$

and $$Kout' = MaxK.$$

The thus corrected values Cout', Mout', Yout', and Kout' are then newly set as the values Cout, Mout, Yout, and Kout.

On the other hand, if the values Kout for all the pixels are smaller than the value MaxK (No in S31), the processing ends without conversion of the values Cout, Mout, Yout, and Kout.

The thus determined Cout, Mout, Yout, and Kout will be subjected to the halftone processing of S3.

It is noted that the CPU 2 executes the CMYK correcting process 4f to perform the CMYK correcting process of FIG. 9(c) after S7 and before S8 during the media printing of FIG. 3(b). In this case, the CPU 21 judges in S31 whether or not the value Kout in a CMYK value set (Cout, Mout, Yout, Kout) that is produced in S7 for each pixel is greater than the value of MaxK. After completing the process of FIG. 9(c), the resultant values Cout, Mout, Yout, and Kout will be subjected to the halftone processing of S8.

The CMYK correcting process of FIG. 9(c) ensures that the value Kout in the CMYK value sets (Cout, Mout, Yout, Kout), which will be subjected to the halftone processing of S3 or S8, are smaller than or equal to the allowable maximum value MaxK for the present printing condition. This ensures that colors obtained by all the cyan, magenta, yellow, and black inks will exhibit substantially the same gloss with colors obtained by cyan, magenta, and yellow inks only. It is possible to prevent occurrence of false contours. By correcting in S32 the CMY values Cout, Mout, Yout based on the difference between the black value Kout and the allowable maximum value MaxK for black for the present printing condition, the corrected CMYK value set (Cout, Mout, Yout, Kout) will faithfully reproduce the color of the original RGB data set (Rin, Gin, Bin).

While the invention has been described in detail with reference to the specific embodiments thereof, it would be apparent to those skilled in the art that various changes and modifications may be made therein without departing from the spirit of the invention.

For example, in the above-described embodiments, the printer 1 is controlled to print seventeen color samples No. 1 to No. 17 by using the seventeen CMYK value sets (Cout, Mout, Yout, Kout), whose constituent values are successively changed by the unit amount of 16. However, the printer 1 may be controlled to print 33 color samples by using 33 CMYK value sets (Cout, Mout, Yout, Kout), whose constituent values are successively changed by the unit amount of 8. Or, the printer 1 may be controlled to print 65 color samples by using 33 CMYK value sets (Cout, Mout, Yout, Kout), whose constituent values are successively changed by the unit amount of 4. Or, the printer 1 may be controlled to print any other desired number of color samples by using desired number of CMYK value sets (Cout, Mout, Yout, Kout), whose constituent values are successively changed by a desired unit amount.

In the above-described embodiments, the printer 1 prints images by using inks of four colors of cyan, magenta, yellow, and black. However, the printer 1 may be modified to print images by using inks of more than four colors including black or by using inks of less than four colors including black.

In the embodiments, each printing condition is defined by a combination of an ink type, a sheet material type, and a printing resolution. However, each printing condition may be defined by a combination of at least one of an ink type, a sheet material type, and a printing resolution. Or, each printing condition may be defined by a combination of at least one of any other desirable factors for printing.

In the above-described embodiments, each look-up table for media printing 4d, 4d' is defined for the three-dimensional RGB color grid space that is defined by dividing the RGB color space almost uniformly into sixteen sections along each axis. However, each look-up table for media printing 4d, 4d' may be defined for other three-dimensional RGB color grid spaces. For example, each look-up table for media printing 4d, 4d' may be defined for a three-dimensional RGB color grid space that is defined by dividing the RGB color space almost uniformly into eight sections along each axis. That is, each axis is divided into eight regions in almost equal intervals with nine grid points. The RGB color grid space therefore has 93 grid points (0, 0, 0), (32, 0, 0), (32, 32, 0), . . . , and (255, 255, 255). The 93 grid points are associated with grid numbers "0"-"$9^3$" in such a manner that the grid number "0" indicates the grid point (R, G, B) of (0, 0, 0), the grid number "1" indicates the grid point (R, G, B) of (32, 0, 0), and so on. The look-up table for media printing 4d, 4d' stores therein a CMY set value (C, M, Y) at each grid point (R, G, B).

What is claimed is:

1. An image processing method, comprising:
   receiving an input value combination that includes a plurality of input values for a plurality of primary colors and that is indicative of image information; and
   converting the received input value combination into an output value combination that includes a plurality of output values for a plurality of components for printing, the plurality of components for printing including black, the output value for black being smaller than or equal to a value of an allowable black maximum,
   an image obtained by printing an output value combination, whose value for black being greater than zero (0) and smaller than or equal to the value of the allowable black maximum value, exhibiting substantially the same gloss with another image obtained by printing an output value combination, whose output value for black being equal to zero (0).

2. The image processing method as claimed in claim 1, further comprising outputting the output value combination as print data.

3. The image processing method as claimed in claim 1, further comprising printing the output value combination.

4. The image processing method as claimed in claim 1, wherein the converting converts the received input value combination into the output value combination by using a conversion table that lists up, in one-to-one correspondence with a plurality of primary-color-value combinations for the plurality of primary colors, a plurality of printing-component-value combinations for the plurality of components for printing including black, the printing-component-value combination for each primary-color-value combination including a printing-component-value for black that is smaller than or equal to the value of the allowable black maximum.

5. The image processing method as claimed in claim 4, wherein the converting includes:
setting a printing condition;
selecting, in accordance with the printing condition, one conversion table from among a plurality of conversion tables that correspond to a plurality of different printing conditions, the allowable black maximum having a plurality of values in one to one correspondence with the plurality of different printing conditions, the conversion table for each printing condition listing up, for each primary-color-value combination, one printing-component-value combination that includes a printing-component-value for black that is smaller than or equal to the corresponding value of the allowable black maximum; and
converting the received input value combination into an output value combination by using the selected conversion table.

6. The image processing method as claimed in claim 5, wherein the printing condition indicates at least one of: a type of a sheet material to be printed on by the output value combination; a type of inks to be used for printing the output value combination; and a resolution, with which the output value combination is to be printed.

7. The image processing method as claimed in claim 1, wherein the converting includes:
converting the received input value combination into an intermediate value combination that includes at least one value for at least one of the plurality of components for printing other than black; and
converting the intermediate value combination into the output value combination for the plurality of components for printing including black, by determining the output value for black that is smaller than or equal to the value of the allowable black maximum based on the intermediate value combination, and by determining the output value for the at least one component for printing other than black based on the determined output value for black.

8. The image processing method as claimed in claim 7, wherein the output value for the at least one component for printing other than black is determined based on a difference between the output value for black and the intermediate value for the at least one component for printing other than black.

9. The image processing method as claimed in claim 7, wherein the converting the intermediate value combination into the output value combination includes:
setting a printing condition; and
selecting, in accordance with the printing condition, one value from among a plurality of values for the allowable black maximum,
wherein the output value for black is determined to be smaller than or equal to the value selected for the allowable black maximum based on the intermediate value combination.

10. The image processing method as claimed in claim 9, wherein the printing condition indicates at least one of: a type of a sheet material to be printed on by the output value combination; a type of inks to be used for printing the output value combination; and a resolution, with which the output value combination is to be printed.

11. The image processing method as claimed in claim 1, wherein the converting the received input value combination into the output value combination includes:
converting the received input value combination into the output value combination;
judging whether or not the output value combination has an output value for black that is greater than the value of the allowable black maximum;
correcting the output value for black that is greater than the value of the allowable black maximum into the value of the allowable black maximum by subtracting, from the subject output value, a black-correcting amount that is equal to a difference between the subject output value and the allowable black maximum; and
correcting the output value for the at least one component for printing other than black based on the corrected output value for black.

12. The image processing method as claimed in claim 11, wherein the received input value combination is converted into the output value combination by using a conversion table that lists up, in one-to-one correspondence with a plurality of primary-color-value combinations for the plurality of primary colors, a plurality of printing-component-value combinations for the plurality of components for printing including black.

13. The image processing method as claimed in claim 11, wherein the correcting the output value for the at least one component for printing other than black includes adding the black-correcting amount to the output value for the at least one component for printing other than black.

14. The image processing method as claimed in claim 11, further comprising:
setting a printing condition;
selecting, in accordance with the printing condition, one value from among a plurality of values for the allowable black maximum, and
wherein the judging includes judging whether or not the output value combination has an output value for black that is greater than the selected value of the allowable black maximum,
wherein the correcting the output value for black includes correcting the output value for black into the selected value of the allowable black maximum, and
wherein the correcting the output value for the at least one component for printing other than black includes correcting the output value for the at least one component for printing other than black based on the selected value of the allowable black maximum.

15. The image processing method as claimed in claim 14, wherein the printing condition indicates at least one of: a type of a sheet material to be printed on by the output value combination; a type of inks to be used for printing the output value combination; and a resolution, with which the output value combination is to be printed.

16. An image processing method as claimed in claim 1, further comprising:
printing color samples by using the plurality of components for printing based on a plurality of sample output value combinations, each sample output value combination including values for the plurality of components for printing including black, a black mixing ratio of the sample output value for the black component relative to the sample output values for the at least one component other than black gradually changing in the plurality of sample output value combinations, the plurality of sample output value combinations including one reference sample output value combination that includes the sample output value for black having a zero (0) value, the plurality of color samples including a reference color sample that is printed based on the reference sample output value combination;

determining some color samples that have substantially the same glossiness as the reference color sample, from among all the plurality of color samples;

selecting one sample output value combination, whose black mixing ratio is the largest, from among sample output value combinations that are used for printing the determined color samples; and setting the value of the allowable black maximum based on the selected one sample output value combination.

17. An image processing device, comprising:
a receiving unit that receives an input value combination that includes a plurality of input values for a plurality of primary colors and that is indicative of image information; and
a converting unit that converts the received input value combination into an output value combination that includes a plurality of output values for a plurality of components for printing, the plurality of components for printing including black, the output value for black being smaller than or equal to a value of an allowable black maximum,
an image obtained by printing an output value combination, whose value for black being greater than zero (0) and smaller than or equal to the value of the allowable black maximum value, exhibiting substantially the same gloss with another image obtained by printing an output value combination, whose output value for black being equal to zero (0).

18. The image processing device as claimed in claim 17, further comprising an output unit that outputs the output value combination as print data.

19. The image processing device as claimed in claim 17, further comprising a printing unit that prints the output value combination.

20. The image processing device as claimed in claim 17, wherein the converting unit converts the received input value combination into the output value combination by using a conversion table that lists up, in one-to-one correspondence with a plurality of primary-color-value combinations for the plurality of primary colors, a plurality of printing-component-value combinations for the plurality of components for printing including black,
the printing-component-value combination for each primary-color-value combination including a printing-component-value for black that is smaller than or equal to the value of the allowable black maximum.

21. The image processing device as claimed in claim 20, wherein the converting unit includes:
a condition-setting unit that sets a printing condition;
a table-selecting unit that selects, in accordance with the printing condition, one conversion table from among a plurality of conversion tables that correspond to a plurality of different printing conditions, the allowable black maximum having a plurality of values in one to one correspondence with the plurality of different printing conditions, the conversion table for each printing condition listing up, for each primary-color-value combination, one printing-component-value combination that includes a printing-component-value for black that is smaller than or equal to the corresponding value of the allowable black maximum; and
an input-to-output-converting unit that converts the received input value combination into an output value combination by using the selected conversion table.

22. The image processing device as claimed in claim 21, wherein the printing condition indicates at least one of: a type of a sheet material to be printed on by the output value combination; a type of inks to be used for printing the output value combination; and a resolution, with which the output value combination is to be printed.

23. The image processing device as claimed in claim 17, wherein the converting unit includes:
an input-to-intermediate converting unit that converts the received input value combination into an intermediate value combination that includes at least one value for at least one of the plurality of components for printing other than black; and
an intermediate-to-output converting unit that converts the intermediate value combination into the output value combination for the plurality of components for printing including black, by determining the output value for black that is smaller than or equal to the value of the allowable black maximum based on the intermediate value combination, and by determining the output value for the at least one component for printing other than black based on the determined output value for black.

24. The image processing device as claimed in claim 23, wherein the intermediate-to-output converting unit determines the output value for the at least one component for printing other than black based on a difference between the output value for black and the intermediate value for the at least one component for printing other than black.

25. The image processing device as claimed in claim 23, wherein the intermediate-to-output converting unit includes:
a condition setting unit that sets a printing condition; and
a selecting unit that selects, in accordance with the printing condition, one value from among a plurality of values for the allowable black maximum,
wherein the intermediate-to-output converting unit determines the output value for black to be smaller than or equal to the value selected for the allowable black maximum based on the intermediate value combination.

26. The image processing device as claimed in claim 25, wherein the printing condition indicates at least one of: a type of a sheet material to be printed on by the output value combination; a type of inks to be used for printing the output value combination; and a resolution, with which the output value combination is to be printed.

27. The image processing device as claimed in claim 17, wherein the converting unit includes:
an input-to-output converting unit that converts the received input value combination into the output value combination;
a judging unit that judges whether or not the output value combination has an output value for black that is greater than the value of the allowable black maximum;
a black correcting unit that corrects the output value for black that is greater than the value of the allowable black maximum into the value of the allowable black maximum by subtracting, from the subject output value, a black-correcting amount that is equal to a difference between the subject output value and the allowable black maximum; and
an other-than-black correcting unit that corrects the output value for the at least one component for printing other than black based on the corrected output value for black.

28. The image processing device as claimed in claim 27, wherein the input-to-output converting unit converts the received input value combination into the output value combination by using a conversion table that lists up, in one-to-one correspondence with a plurality of primary-color-value combinations for the plurality of primary colors, a plurality of printing-component-value combinations for the plurality of components for printing including black.

29. The image processing device as claimed in claim 27, wherein the other-than-black correcting unit includes an adding unit that adds the black-correcting amount to the output value for the at least one component for printing other than black.

30. The image processing device as claimed in claim 27, further comprising:
  a condition setting unit that sets a printing condition;
  a selecting unit that selects, in accordance with the printing condition, one value from among a plurality of values for the allowable black maximum, and
  wherein the judging unit judges whether or not the output value combination has an output value for black that is greater than the selected value of the allowable black maximum,
  wherein the black-correcting unit corrects the output value for black into the selected value of the allowable black maximum, and
  wherein the other-than-black correcting unit corrects the output value for the at least one component for printing other than black based on the selected value of the allowable black maximum.

31. The image processing device as claimed in claim 30, wherein the printing condition indicates at least one of: a type of a sheet material to be printed on by the output value combination; a type of inks to be used for printing the output value combination; and a resolution, with which the output value combination is to be printed.

32. A computer readable storage medium storing an image processing program readable by a computer, the image processing program comprising:
  a program of receiving an input value combination that includes a plurality of input values for a plurality of primary colors and that is indicative of image information; and
  a program of converting the received input value combination into an output value combination that includes a plurality of output values for a plurality of components for printing, the plurality of components for printing including black, the output value for black being smaller than or equal to a value of an allowable black maximum,
  an image obtained by printing an output value combination, whose value for black being greater than zero (0) and smaller than or equal to the value of the allowable black maximum value, exhibiting substantially the same gloss with another image obtained by printing an output value combination, whose output value for black being equal to zero (0).

* * * * *